(12) United States Patent
Jerauld et al.

(10) Patent No.: US 10,041,339 B2
(45) Date of Patent: Aug. 7, 2018

(54) OIL RECOVERY PROCESSING USING A LOW SALINITY FLUID COMPOSITION

(71) Applicant: BP Exploration Operating Company Limited, Middlesex (GB)

(72) Inventors: Gary Russell Jerauld, Naperville, IL (US); Hourshad Mohammadi, Houston, TX (US)

(73) Assignee: BP Exploration Operating Company Limited

( * ) Notice: Subject to any disclaimer, the term of this patent is extended or adjusted under 35 U.S.C. 154(b) by 78 days.

(21) Appl. No.: 14/377,073

(22) PCT Filed: Feb. 8, 2013

(86) PCT No.: PCT/EP2013/052614
§ 371 (c)(1),
(2) Date: Aug. 6, 2014

(87) PCT Pub. No.: WO2013/117741
PCT Pub. Date: Aug. 15, 2013

(65) Prior Publication Data
US 2014/0345862 A1   Nov. 27, 2014

Related U.S. Application Data

(60) Provisional application No. 61/596,789, filed on Feb. 9, 2012.

(51) Int. Cl.
*E21B 43/20* (2006.01)
*C09K 8/588* (2006.01)
(Continued)

(52) U.S. Cl.
CPC ............... *E21B 43/20* (2013.01); *C09K 8/58* (2013.01); *C09K 8/588* (2013.01); *E21B 43/16* (2013.01)

(58) Field of Classification Search
CPC .......... E21B 43/16; E21B 43/26; E21B 43/20; C09K 8/58
(Continued)

(56) References Cited

U.S. PATENT DOCUMENTS 3,042,611 A * 7/1962 Patton ........................... 166/275
3,053,765 A * 9/1962 Sparks ........................... 166/400
(Continued)

OTHER PUBLICATIONS

Vermolen, E.C.M., et al., "Pushing the Envelope for Polymer Flooding Towards High-Temperature and High-Salinity Reservoirs with Polyacrylamide Based Ter-Polymers," Society of Petroleum Engineers, SPE Middle East Oil and Gas Show and Conference, Manama, Bahrain, Sep. 25-28, 2011 (SPE 141497) (8 p.).
(Continued)

*Primary Examiner* — Silvana C Runyan
(74) *Attorney, Agent, or Firm* — John L. Wood

(57) ABSTRACT

Method of recovering oil from a subterranean oil-bearing reservoir by using an injection fluid containing a viscosifying polymer in a low salinity water. The low salinity water has a total dissolved solids (TDS) content of 15,000 ppmv or less, and the ratio of the multivalent cation content of the low salinity water to the multivalent cation content of the connate water of the reservoir is less than 1. The viscosity of the injection fluid is in the range of 3 to 200 cP, and the reservoir is penetrated by one or more injection wells and by one or more production wells. The method includes injecting the injection fluid into at least one of the injection wells in a slug size in the range of 0.4 to 1.5 pore volume (PV).

37 Claims, 15 Drawing Sheets

(51) Int. Cl.
*E21B 43/16* (2006.01)
*C09K 8/58* (2006.01)

(58) Field of Classification Search
USPC .................................. 166/275, 305.1, 369
See application file for complete search history.

(56) References Cited

U.S. PATENT DOCUMENTS

| | | | | |
|---|---|---|---|---|
| 3,707,187 | A | * | 12/1972 | Knight ........................ 166/246 |
| 3,749,172 | A | * | 7/1973 | Hessert et al. ............... 166/400 |
| 3,811,505 | A | * | 5/1974 | Flournoy ............... C09K 8/584 |
| | | | | 166/270.1 |
| 4,266,611 | A | | 5/1981 | Bousaid et al. |
| 6,566,410 | B1 | * | 5/2003 | Zaki .................... B01D 17/047 |
| | | | | 208/188 |
| 2010/0006283 | A1 | * | 1/2010 | Collins et al. ............... 166/261 |

OTHER PUBLICATIONS

Camilleri, D., et al., "Improvements in Physical-Property Models Used in Micellar/Polymer Flooding," SPE Reservoir Engineering, Nov. 1987, pp. 433-440 (8 p.).

Camilleri, D., et al., "Description of an Improved Compositional Micellar/Polymer Simulator," SPE Reservoir Engineering, Nov. 1987, pp. 427-432 (6 p.).

McGuire, P.L., et al., "Low Salinity Oil Recovery: An Exciting New EOR Opportunity for Alaska's North Slope," Society of Petroleum Engineers, SPE Western Regional Meeting, Irvine, California, Mar. 30-Apr. 1, 2005 (SPE 93903) (16 p.).

Jerauld, G.R., et al., "Modeling Low-Salinity Waterflooding," Society of Petroleum Engineers, SPE Annual Technical Conference and Exhibition, San Antonio, Texas, Sep. 24-27, 2006 (SPE 102239) (14 p.).

Lake, Larry W., "Chapter 8 Polymer Methods," Enhanced Oil Recovery, 1989, pp. 314-353 (38 p.).

Ayirala, Subhash, et al., "A Designer Water Process for Offshore Low Salinity and Polymer Flooding Applications," Society of Petroleum Engineers, SPE Improved Oil Recovery Symposium, Tulsa, Oklahoma, Apr. 24-28, 2010 (SPE 129926) (10 p.).

Lee, Seungjun, et al., "Development of a Comprehensive Rheological Property Database for EOR Polymers," Society of Petroleum Engineers, SPE Annual Technical Conference and Exhibition, New Orleans, Louisiana, Oct. 4-7, 2009 (SPE 124798) (14 p.).

* cited by examiner

OIL RECOVERY PROCESSING USING A LOW SALINITY FLUID COMPOSITION

CROSS REFERENCE TO RELATED APPLICATIONS

This application is a 35 U.S.C. § 371 national stage application of PCT/EP2013/052614 filed Feb. 8, 2013, which claims the benefit of U.S. Provisional Application No. 61/596789 filed Feb. 9, 2012, all of which are incorporated herein by reference in their entireties for all purposes.

This invention relates to oil recovery from subterranean reservoirs. More particularly, it relates to oil recovery using injection fluids, especially enhanced recovery using injection fluids comprising polymers.

BACKGROUND OF THE INVENTION

It has long been known that only a portion of the oil can be recovered from an oil-bearing subterranean formation as a result of the natural energy of the reservoir. So-called secondary recovery techniques are used to force more oil out of the reservoir, the simplest method of which is by direct replacement with another medium, usually water or gas.

"Water-flooding" is one of the most successful and extensively used secondary recovery methods. Water is typically injected, under pressure, into reservoir rock formations via injection wells. The injected water acts to help maintain reservoir pressure, and sweeps the displaced oil ahead of it through the rock towards production wells from which the oil is recovered. The water used in water-flooding may be a high salinity water, for example, seawater, estuarine water, a saline aquifer water, or a produced water (water separated from oil and gas at a production facility). By "high salinity" water is meant that the water has a total dissolved solids (TDS) content of greater than 20,000 ppmv, for example, greater than 30,000 ppmv.

Enhanced oil recovery (EOR) techniques can also be used. The purpose of such EOR techniques is not only to restore or maintain reservoir pressure, but also to improve oil displacement in the reservoir, thereby further reducing the residual oil saturation of the reservoir, that is, the volume of oil remaining in the reservoir.

Injection of an aqueous solution of a polymer (also known as polymer flooding) has been used as an EOR technique for over 60 years. Its application has been predominantly onshore in reservoirs, in which the oil is of relatively high viscosity.

Generally, polymer flooding consists of adding a water-soluble polymer to an injection water (aqueous base fluid), thereby providing an injection fluid having an increased viscosity and reduced mobility in the reservoir compared with the aqueous base fluid. Polymer flooding increases hydrocarbon, e.g. oil, recovery above secondary recovery (e.g. water flooding) mainly by improving microscopic and volumetric sweep efficiency. This can be especially beneficial, since in many reservoirs injection water is more mobile than oil so it tends to bypass lower permeability regions of the reservoir leaving behind significant volumes of oil. The difference between the mobility of the aqueous solution of the polymer and that of the oil in the reservoir is less than the difference between the mobility of the aqueous base fluid and the oil in the reservoir. This reduction in the mobility of the aqueous injection fluid relative to the mobility of the oil may lead to an enhanced oil recovery.

Normally, reservoirs having oil viscosities of 3 centipoise (cP) or greater may be considered suitable for polymer flooding, i.e. EOR using an aqueous solution or dispersion of a polymer.

It is also known that the use of a lower salinity injection water during water-flooding can increase the amount of oil recovered compared to the use of a higher salinity water. The low salinity water may be, for example, lake water, river water, a low salinity aquifer water, or a desalinated water.

It is also known that reducing the multivalent cation content of a lower salinity injection water can have an impact on the oil recovery.

Thus, International Patent Application No. WO2008/029124 teaches that oil recovery from a reservoir comprising a sandstone oil-bearing rock formation is enhanced (in comparison with injection of a high salinity water) when the injection water has a total dissolved solids (TDS) content in the range of 200 to 12,000 ppmv and the ratio of the multivalent cation content of the injection water to that of the connate water contained within the sandstone rock is less than 1.

SUMMARY OF THE INVENTION

This invention relates to aspects of the use of a polymer in a lower salinity injection water, that is, a combined low-salinity waterflood and polymer flood.

In accordance with the present invention, there is provided a method which includes recovering oil from a subterranean oil-bearing reservoir using an injection fluid comprising a viscosifying polymer in a low salinity water, the reservoir being penetrated by one or more injection wells and one or more production wells, the method comprising injecting the injection fluid into at least one of the injection wells.

Further features and advantages of the invention will become apparent from the following description of preferred embodiments of the invention, given by way of example only, which is made with reference to the accompanying drawings.

DETAILED DESCRIPTION OF THE INVENTION

Figure 1:
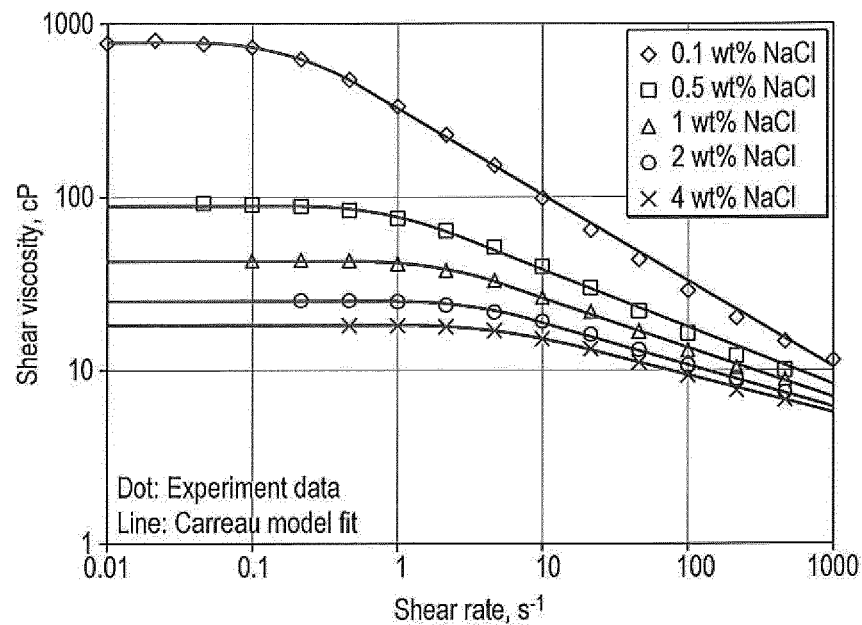
FIG. 1 shows the rheological behaviour of an aqueous fluid comprising 2000 ppm of a partially hydrolysed polyacrylamide, HPAM 3330S, at a temperature of 25° C. as a function of salinity (above) and divalent cation concentration (below); data from SPE 124798 (Lee, S., Kim, D. H., Huh, C., and Pope, G. A. (2009) Development of a Comprehensive Rheological Property Database for EOR Polymers, paper SPE 124798 presented at SPE Annual Technical Conference and Exhibition held in New Orleans, La., USA, 4-7 October).
Figure 1:
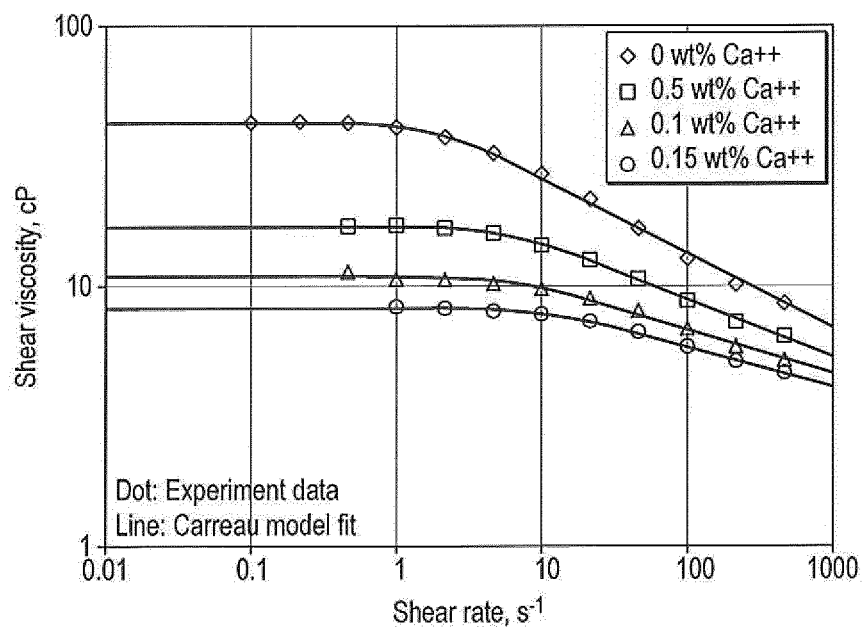
Figure 2:
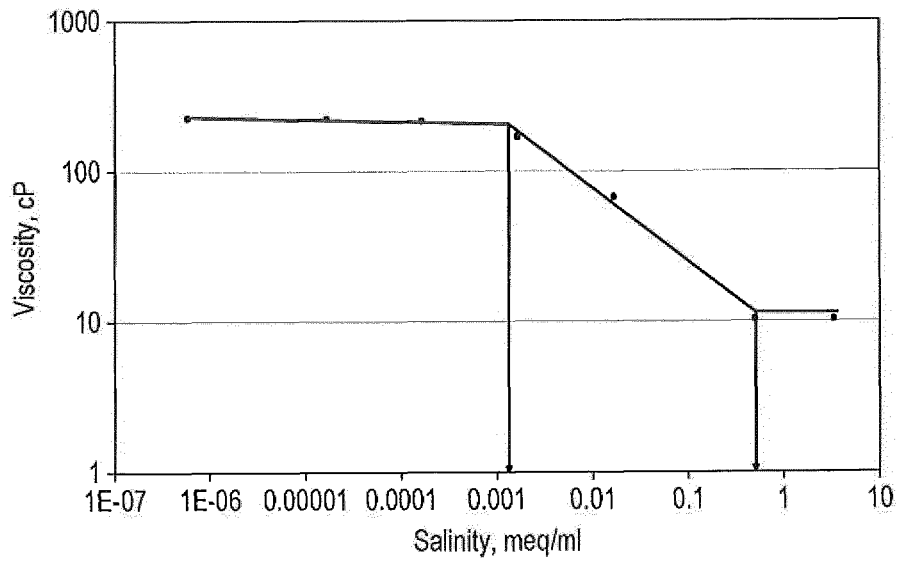
FIG. 2 shows polymer viscosity vs. salinity over a large range of salinity; data from SPE 141497 (Vermolen, E. C. M., van Haasterecht, M. J. T., Masalmeh, S. K., Faber, M. J., Boersma, D. M., and Gruenenfelder, M. (2011) Pushing the Envelope for Polymer Flooding Towards High-temperature and High-salinity Reservoirs with Polyacrylamide Based Ter-polymers, paper SPE 141497 presented at the SPE Middle East Oil and Gas Show and Conference held in Manama, Bahrain, 25-28 September).

In accordance with the present invention, there is provided a method of recovering oil from a subterranean oil-bearing reservoir using an injection fluid comprising a viscosifying polymer in a low salinity water, the reservoir being penetrated by one or more injection wells and one or more production wells, the method comprising injecting the injection fluid into at least one of the injection wells in a slug size in the range of 0.4 to 1.5 pore volumes (PV).

The Low Salinity Water

The low salinity water has a total dissolved solids (TDS) content of 15,000 ppmv or less, preferably less than 12,000 ppmv, more preferably, less than 10,000 ppmv, most preferably, less than 8,000 ppmv, in particular, less than 5,000 ppmv. The low salinity water has a total dissolved solids (TDS) content of at least 100 ppmv, preferably, at least 200 ppmv, more preferably, at least 500 ppmv, most preferably, at least 1000 ppmv. Preferably, the ratio of the multivalent cation content of the low salinity water to the multivalent cation content of the connate water of the reservoir is less than 1, more preferably less than 0.9, for example, less than 0.8.

The term "connate water" refers to the original water that was trapped in the pore space of the formation rock of the reservoir (prior to any injection of water into the reservoir during recovery of oil from the reservoir).

The invention may be applied for enhanced recovery of oil from a reservoir where the connate water has a wide range of TDS levels, typically, 500 to 200,000 ppmv, preferably, 2,000 to 50,000 ppmv, in particular 10,000 to 50,000 ppmv, especially 20,000 to 45,000 ppmv. As discussed above, the connate water is the original water associated with the oil in the formation rock of the reservoir and is in equilibrium with the oil and the formation rock of the reservoir, especially in relation to its multivalent cation content, in particular its divalent cation (e.g. calcium or magnesium cation) content. The calcium cation content of the connate water is usually at least 50 ppm, such as 50 to 2,000 ppmv and especially 100 to 500 ppmv. The magnesium cation content of the connate water is usually at least 10 ppm, such as 10 to 2,000 ppmv, and especially 20 to 200 ppmv. The total divalent cation content of the connate water is usually at least 100 ppmv, such as 100 to 5,000 ppmv, preferably, 150 to 3,000 ppmv, especially 200 to 1,000 ppmv. Generally, connate water contains low levels of trivalent cations, usually less than 100 ppmv.

Where the method of the present invention is to be used during secondary or tertiary recovery of oil from the reservoir, a sample of connate water may be obtained by taking a core of rock from the reservoir, either before production of oil from the reservoir or during primary recovery, and determining the multivalent cation content of the water contained within the core. Alternatively, where there has been water break-through but the reservoir remains in primary recovery, the multivalent cation content of the water that is separated from the produced oil may be determined.

It is preferred that the low salinity water that is employed as the base fluid of the injection fluid has a multivalent cation content of less than 200 ppmv, more preferably, less than 100 ppmv, in particular, 40 ppmv or less, for example, less than 25 ppmv.

Suitable low salinity waters include desalinated water, fresh water such as river water or lake water, low salinity estuarine water resulting from the mixing of fresh water and seawater in estuaries, low salinity aquifer water and low salinity produced water (water separated from oil and gas at a production facility). If desired, mixtures of waters may be used as the source of the low salinity water for the injection fluid, for example, a low TDS aquifer water or desalinated water mixed with a higher salinity water such as a produced water or seawater.

The Oil-Bearing Reservoir

The oil-bearing reservoir typically takes the form of an oil-bearing subterranean rock formation having sufficient porosity and permeability to store and transmit fluids, and with which oil is associated, for example being held in pores or between grains of the rock formation. The reservoir typically includes connate water.

The rock formation may include sandstone rock with which the oil is associated, whether by inclusion in pores or between grains or otherwise.

The rock formation, for example, sandstone rock, of the reservoir may comprise minerals in an amount of up to 50% by weight, more preferably, 1 to 30% and especially 2.5 to 20% by weight. The mineral may be a clay, in particular, clay of the smectite type (such as montmorillonite), pyrophyllite type, kaolinite type, illite type, glauconite type, and chlorite type. Preferably, the clay is non-swelling under the conditions of recovery of crude oil from the reservoir. Examples of other minerals that may be present in a sandstone rock include transition metal compounds, such as oxides and carbonates, for example, iron oxide, siderite, and plagioclase feldspars. The amount of minerals in the sandstone rock may be determined by X-ray diffraction using ground-up reservoir rock.

Where the rock formation, for example, sandstone rock of the oil-bearing reservoir contains swelling clays, in particular, smectite clays, a relatively high TDS for the low salinity water may be required in order to stabilize the clays, thereby mitigating the risk of formation damage. Thus, where the rock formation contains an amount of swelling clays sufficient to result in formation damage (for example, an amount of swelling clays of greater than 10% by weight), the low salinity water preferably has a total dissolved solids content (TDS) in the range of 8,000 to 15,000 ppmv. Where the rock formation comprises amounts of swelling clays that do not result in significant formation damage (for example, an amount of swelling clays of less than 10% by weight), the TDS of the low salinity water is typically in the range of 100 to 8,000 ppmv, preferably 200 to 5,000 ppmv, for example, 200 to 3,000 ppmv.

The oil that is contained in the reservoir may be a crude oil having an American Petroleum Institute (API) gravity of at least 15°, preferably at least 16°, for example an API gravity in the range of 16 to 30°.

The oil that is contained in the reservoir may in general have a viscosity under reservoir conditions in the range of from 3 to 200 centipoise (cP), for example in the range of from 5 to 175 cP, and in particular in the range of from 10 to 150 cP. However, in certain aspects, the present invention relates in particular to higher viscosity oils. This is discussed later in relation to secondary recovery of oil. In such cases, the viscosity of the oil will be in the range of from 40 to 200 cP, preferably from 45 to 175 cP, in particular from 47 to 150 cP.

Typically, the oil that is associated with the reservoir rock has gas dissolved therein.

The Viscosifying Polymer and the Injection Fluid

Typically, the polymer(s) to be used as the viscosifying polymer may be any usable in an Enhanced Oil Recovery operation (EOR). The polymer(s) may be homo or heteropolymer(s) (e.g. copolymer, terpolymer and so on). The polymer(s) will generally be ionic, for example anionic. The polymer, or one or more of the polymers, may be an acrylamide polymer. The polymer(s) may be partially hydrolyzed. The degree of hydrolysis ($\tau$) may be from 0.15 to 0.40, and is typically from 0.25 to 0.35. The polymer(s) may be a partially hydrolysed polyacrylamide (HPAM), for example having a degree of hydrolysis of from 0.15 to 0.40 or from 0.25 to 0.35. A suitable polymer may be selected from the FLOPAAM™ series supplied by SNF SAS. Members of the FLOPAAM™ series, which may be supplied as a powder or as an emulsion, include FLOPAAM™ 3630, FLOPAAM™ 3530, FLOPAAM™ 3430, FLOPAAM™ 3330, FLOPAAM™ 2530, FLOPAAM™ 2430, and FLOPAAM™ 2330.

The injection fluid is preferably a solution of the viscosifying polymer in the low salinity water. However, the injection fluid may also be a dispersion of the viscosifying polymer in the low salinity water, and such dispersions are also included in the present invention.

Advantageously, the polymer is, or polymers are, substantially evenly distributed within the injection fluid.

The injection fluid is typically aqueous, and is thus usually an aqueous solution of the viscosifying polymer, or an aqueous dispersion of the viscosifying polymer.

Optionally the polymer may be supplied as a powder. Preferably the polymer powder is at least 80% by weight active, preferably at least 90%, say in excess of 95% by weight active. Preferably the powder is used to prepare a mother solution or dispersion of the polymer in water having a polymer concentration of at least 5% by weight, preferably at least 10% by weight, for example, 5 to 20% by weight. Typically the powder will take approximately at least two hours to hydrate when preparing the mother solution or dispersion. Alternatively, the polymer powder may be added directly to the low salinity water to form the viscosified low salinity injection fluid.

Preferably, the mother solution or dispersion may comprise up to 20,000 ppm of the polymer by weight. For instance, the mother solution or dispersion may comprise around 10,000 ppm of the polymer by weight. Preferably the mother solution or dispersion is dosed into the low salinity water such that the resulting injection fluid may comprise up to 2,000 ppm of the polymer by weight. The injection fluid typically comprises at least 500 ppm of the polymer by weight. For instance, the injection fluid may comprise around 1,500 ppm, 1,250 ppm, 1,000 ppm or 700 ppm of the polymer by weight.

The polymer may be supplied in the form of a concentrated dispersion, e.g. a colloidal dispersion (as opposed to being supplied in the form of a powder which is subsequently used to form a concentrated dispersion). Thus, a concentrated dispersion of polymer in a fluid, e.g. water may be added to the low salinity water.

Alternatively the polymer may be supplied in the form of an emulsion comprising a dispersed aqueous phase, in which the polymer is dissolved or dispersed, in a continuous oil phase, e.g. an emulsion in which droplets of the aqueous phase are dispersed in the oil phase. Preferably the aqueous phase is a highly concentrated polymer solution. Preferably, the oil phase is a mineral oil. Preferably the emulsion comprises 28-32% (w/w) polymer, for example 30% polymer (w/w).

Surfactants may be present in the solution, emulsion or other dispersion of polymer. For example, surfactants may be used to break a polymer emulsion if the polymer is used in emulsion form.

Preferably the mother solution, dispersion or emulsion is dosed into the low salinity water to give an injection fluid having the desired concentration of polymer and the desired viscosity under reservoir conditions. The mother solution, dispersion or emulsion may be dosed or injected into the low salinity injection water through a dedicated water injection swivel or through a port in an injection manifold.

The viscosity of the injection fluid may be controlled and/or altered by introducing one or more different polymers into the injection fluid, for example replacing a first polymer with a second, or introducing a second polymer into the stream comprising a first polymer. Thus, the viscosity of the injection fluid may be controlled and/or altered by selecting the molecular weight and/or chemical composition of the polymer(s). The viscosity of the injection fluid can also be controlled and/or altered by altering the concentration of polymer in the injection fluid.

It has been found that the viscosity of a polymer solution may be dependent upon the ratio of comonomers in the polymer. For example, HPAM polymers are typically copolymers of acrylic acid and acrylamide. The viscosity of a polymer solution or dispersion increases with increasing mole % of structural units derived from acrylic acid in the polymer. However, higher acrylic acid contents result in the polymer adsorbing to the reservoir rock thereby reducing the in situ polymer concentration. A balance therefore needs to be struck. Typically the polymer contains from 15 to 40 mol % of acrylic acid residues, for example from 25 to 35 mol % of acrylic acid residues.

The viscosity of a polymer solution depends on the salinity of the water employed as the base fluid for the solution or dispersion of polymer. The viscosity increases with decreasing salinity. Therefore, an advantage of using low salinity water in the injection fluid of the present invention is that lower polymer concentrations can be used to achieve the same viscosity compared with employing high salinity base fluids.

Typically, the method of the present invention may be applied in reservoirs having a temperature of up to 140° C. Higher temperatures may be outside the operating range for existing hydrolysed polyacrylamide polymers. Since polyacrylamide polymers widely used in chemical EOR processes tend to hydrolyze at high temperatures and the hydrolysed polymer tends to precipitate if the multivalent cation concentration (e.g. calcium concentration) is above 200 ppmv, the method of the present invention is useful at reservoir temperatures of at or above 100° C., as well as below 100° C., for example, at reservoir temperatures of from 100° C. to 140° C. The method of the present invention may also enable the use of polyacrylamide polymers with a higher initial degree of hydrolysis. By "high degree of hydrolysis" is meant a polyacrylamide polymer wherein the degree of hydrolysis ($\tau$) of the acrylamide units is at least 0.33.

The method of the present invention may be practiced in reservoirs containing oil having a viscosity lower or higher than that which is usual for reservoirs considered suitable for a polymer flood, for example, 3 to 200 cP.

The viscosity of polymer solutions decreases with increasing shear rate. The related plot of viscosity of polymer solution vs. shear rate initially follows a Newtonian plateau, in other words, there is relatively constant viscosity with increasing shear rate up to a certain point. Beyond this point, viscosity begins to drop with increasing shear rate. If the polymer does not degrade, the viscosity will follow the same curve if the shear rate is reduced. If the shear rate is so high that the polymer chains cleave, then the viscosity will no longer follow the same curve with decreasing shear rate but will follow a different Newtonian plateau at a lower viscosity. Therefore, the viscosity at the lowest shear rate will be lower than if there had been no degradation.

The viscosity curves shift upwards with increasing concentration of polymer. Preferably the shear rates under reservoir conditions will be on the Newtonian plateau. Preferably the downhole shear rate will lead to minimal or, more preferably, no shear degradation. Preferably the treatment is designed so that the conditions downhole are close to the Newtonian region of the viscosity of polymer solution vs. shear rate curve.

It is known in the art that viscosity of a polymeric solution, dispersion or emulsion is dependent upon certain factors, for example one or more of temperature and shear rate and multivalent cation concentration (especially Calcium). The temperature and shear rate deep in a reservoir typically cannot be controlled. However, the viscosity of the injected polymer flood under reservoir conditions will also be dependent on: (a) the polymer type (chemical structure), (b) the molecular weight of the polymer and hence the extent of any shear degradation of the polymer, in other words cleaving of the polymer chains; and (c) the concentration of polymer in the injection fluid.

Preferably the concentration of polymer in the injection fluid is selected to give a desired viscosity and/or mobility under reservoir conditions, for example, at the reservoir temperature and pressure and estimated shear rate within the reservoir.

Preferably the ratio of the mobility of the oil to the in situ mobility of the injection fluid is close to or at 1:1. Typically this ratio can be 0.1-1:1-1.5, say 0.5-1:1-1.5. Preferably the mobility of the injection fluid under reservoir conditions is not higher than that of the oil.

Preferably, laboratory experiments are used to predict the viscosity of the injection fluid in the reservoir. For example, such predictions may be based on one or more of polymer type, polymer molecular weight, polymer concentration, reservoir temperature, injection brine composition, and shear rate within the reservoir. This is because it is known that the viscosity of the injection fluid in the injection line downstream of the dosing point will differ from the viscosity deep within the reservoir (for example, at a radial distance of greater than 10 meters from the injection wellbore).

Economic factors may also be considered when selecting the optimal viscosity of the injection fluid, in particular, the desire to minimize the amount of polymer required, since the polymer may be relatively expensive, and the need to maximize the net present value (NPV) of the project. Accordingly, it may be preferred to conduct a reservoir simulation and, optionally, an economic study, when estimating the optimal viscosity of the injection fluid. Therefore, the method may achieve an optimum or near optimum balance between cost and incremental oil recovery.

The viscosity of the injection fluid will typically be in the range of 3 to 200 cP. The starting viscosity will typically be chosen to match the viscosity of the fluid in the reservoir.

Viscosity of the polymer solution is a function of the polymer composition and its molecular weight, polymer concentration, brine composition, temperature and shear rate. With all other factors fixed for the reservoir, it is the selected polymer and the concentration at which it is deployed, and the salinity of the aqueous base fluid, that determines the reduction in mobility ratio of the waterflood and the enhanced oil recovery. It is also the selected polymer and its concentration, and the selected brine composition, that limits the injection rate into the reservoir and determines whether reservoir voidage can be maintained. Herein the mobility ratio is understood to mean the ratio of the mobility of the injection water (displacing fluid) to the mobility of the oil (displaced fluid).

The polymer may be a partially-hydrolyzed polyacrylamide (HPAM) such as FLOPAAM™ 3630 S. This polymer is capable of imparting a high viscosity to an aqueous fluid (the viscosity being dependent upon the polymer concentration). Preferably, the solution of the polymer is shear thinning. Thus, polyacrylamide polymers hydrolyze at high temperatures and at above a certain divalent cation concentration are prone to precipitation. If divalent cation concentrations, such as calcium and magnesium cations concentrations are kept below about 500 ppm, preferably, below 200 ppm the use of polyacrylamide polymers is feasible at reservoir temperatures of up to 140° C.

The Slug Size

If an injection fluid consists of low salinity water without viscosifying polymer, it has been found that incremental oil recovery is achieved until the amount of injected fluid is about 0.3 pore volumes (PV). Above this pore volume of low salinity water, incremental oil recovery declines dramatically with little further benefit in oil recovery being observed.

It is believed that a slug of injection fluid consisting of low salinity water without viscosifying polymer of less than 0.3 PV tends to dissipate in the reservoir through mixing with the connate water and/or any previously injected water that is present in the pore space of the reservoir rock and/or with a subsequently injected aqueous drive fluid. On the other hand, if a slug of injection fluid consisting of low salinity water without viscosifying polymer of at least 0.3 PV is injected into the reservoir, it is believed that the slug remains intact in the reservoir such that a front of the injection fluid moves through the reservoir until the injection fluid breaks through into the production well.

By contrast to the situation where the injection fluid is a low salinity water without viscosifying polymer, it has been found in the present invention that there continues to be benefits in terms of incremental oil recovery above 0.3 PV. In the case of low viscosity oil, for example oil with viscosity of from 3 to 40 cP, for example around 5 cP, incremental oil recovery declines at about 1.0 to 1.2 PV of injected fluid. In the case of high viscosity oil, for example oil with viscosity of from 40 to 200 cP, or from 45 to 175 cP, or from 47 to 150 cP, for example around 50 cP, incremental oil recovery declines at about 0.7 to 0.8 PV of injected fluid.

According to the present invention, the slug size of the injection fluid (comprising a viscosifying polymer in a low salinity water) may be in the range of from 0.4 PV to 2.0 PV. However, it is preferably in the range of from 0.5 to 1.5 PV. In the case of high viscosity oil, for example oil with viscosity of from 40 to 200 cP, or from 45 to 175 cP, or from 47 to 150 cP, for example around 50 cP, the slug size of injection fluid may be in particular in the range of from 0.5 to 0.9 PV, for example, from 0.6 to 0.8 PV. In the case of low viscosity oil, for example oil with viscosity of from 3 to 40 cP, for example around 5 cP, the slug size of injection fluid may be in particular in the range of from 0.7 to 1.5 PV, for example, from 0.8 to 1.2 PV.

Economic factors may also be considered when selecting the optimal slug size of the injection fluid, in particular, the desire to minimize the amount of polymer and low salinity water required, since the polymer, and the low-salinity water production, may be relatively expensive. Accordingly, it may be preferred to conduct a reservoir simulation and, optionally, an economic study, when estimating the optimal slug size of the injection fluid. Therefore, the method may achieve an optimum or near optimum balance between cost and incremental oil recovery when using a viscosifying polymer in a low salinity water.

The term "pore volume" ("PV") is used herein to mean the swept volume between an injection well and a production well. The pore volume between an injection well and production well may be readily determined by methods known to the person skilled in the art. Such methods include modelling studies. However, the pore volume may also be determined by passing a water having a tracer contained therein through the reservoir from the injection well to the production well. The swept volume is the volume swept by the injection fluid averaged over all flow paths between the injection well and production well. This may be determined with reference to the first temporal moment of the tracer distribution in the produced water, as would be well known to the person skilled in the art.

The superficial velocity of the injection fluid in the reservoir is typically in the range of 0.015 to 10 feet/day (0.0045 to 3 meters/day) and more often is in the range of 1 to 4 feet per day (0.3 to 1.2 meters/day) at a radial distance of greater than 20 feet from the injection well. The interwell spacing between the injection well and the production well may typically be 1000 to 8000 feet (304.8 to 2438.4 meters). It may therefore take months or years for the bank of released oil and for the injection fluid to break-through into the production well. Thus, there is a delay between commencement of injection of the injection fluid into the reservoir and recovery of the incremental oil at the production well.

After injection of the injection fluid, a drive fluid may be injected into the reservoir. The drive fluid may be a higher salinity water than the low salinity water that is used in the injection fluid, and, for example, may be seawater, a high salinity produced water or a high salinity aquifer water. Typically, the high salinity, drive fluid has a TDS of at least 20,000 ppm, for example, at least 30,000 ppm. The high salinity water employed as the drive fluid is typically a hard water having a multivalent cation content of at least 100 ppmv, preferably, at least 500 ppmv, in particular, at least 1000 ppmv, for example, at least 1500 ppmv. However, the drive fluid may also be a low salinity water as defined for the injection fluid. The person skilled in the art will understand that for offshore reservoirs, the supply of a low salinity water may be limited such that it is preferred to use a high salinity water as the drive fluid.

The drive fluid sweeps the injection fluid (and hence the bank of released oil) through the reservoir to the production well. In addition to sweeping the injection fluid through the reservoir, injection of the drive fluid may be required to maintain the pressure in the reservoir. Typically, the drive fluid is injected into the reservoir in a greater pore volume than the injection fluid, for example, a pore volume of at least 1, preferably, at least 2, for example, in the range of 2 to 10.

Typically, the viscosity of the injection fluid at reservoir conditions is in the range of 3 to 200 centipoise. In contrast, the viscosity of the drive fluid at reservoir conditions is typically in the range of 0.3 to 1 centipoise.

A spacer fluid may be injected into the reservoir before and/or after injection of the injection fluid comprising the viscosifying polymer in the low salinity water. The spacer fluid may be the low salinity water base fluid or a softened high salinity water. Typically, the spacer fluid is injected in an amount of at least 0.05 PV, for example, at least 0.1 PV. The use of a spacer fluid having a low concentration of multivalent cations mitigates the risk of polymer at the front or tail of the slug of viscosifying polymer in the low salinity aqueous base fluid encountering multivalent cations that could otherwise precipitate the polymer.

In the method of the invention, the injection fluid is preferably injected under pressure, for example, at a pressure of 10,000 to 100,000 kPa (100 to 1000 bar) into at least one injection well that is spaced from a production well, and passes directly into the oil-bearing rock of the reservoir from the injection well. The passage of the injection fluid displaces oil from the reservoir rock and forces the displaced oil ahead of it, and towards the production well from which the oil is recovered.

Recovery Mode

The method of the invention may be used at commencement of oil production from the reservoir (omitting primary recovery), in secondary recovery mode (after primary recovery of oil under the natural pressure of the reservoir) or in tertiary recovery mode (for example, after a waterflood with a high salinity water or a low salinity water).

The person skilled in the art will understand that in secondary recovery mode, a fluid is injected into the reservoir from an injection well in order to maintain the pressure in the reservoir and to sweep oil towards a production well. An advantage of injecting the injection fluid of the present invention into the reservoir during secondary recovery, is that the injection fluid has been formulated so as to release additional oil from the surface of the pores of the reservoir rock and/or to be more effective at sweeping the released oil through the reservoir. Accordingly, there may be a longer period of dry oil recovery from the production well thereby deferring water break-through. In addition, even after water break-through, there will be enhanced recovery of oil compared with using low salinity water without viscosifying polymer as the injection water. Further, there may be less water production (a higher oil to water ratio) for a given volume of produced fluid compared with using low salinity water without viscosifying polymer as the injection water. These advantages also apply if the method of the present invention is used at commencement of oil production from a reservoir.

According to the present invention, it has been surprisingly found that an improved synergistic behaviour in secondary recovery between low salinity waterflood and polymer flood is observed in relation to more viscous oil. Accordingly, it is preferred to apply the method of the present invention in secondary recovery where the oil has a viscosity of from 40 to 200 cP, or from 45 to 175 cP, in particular from 47 to 150 cP.

The person skilled in the art will understand that in tertiary recovery mode, injection of the original fluid is stopped and a different fluid is injected into the reservoir for enhanced oil recovery. Thus, the fluid that is injected into the reservoir during tertiary recovery is the injection fluid of the present invention (comprising a viscosifying polymer in a low salinity water), and the fluid that has previously been injected into the reservoir during secondary recovery may be a low salinity water (that does not contain any polymer) or a high salinity water such as seawater or a high salinity produced water.

There may be one injection well and one production well, but preferably there may be more than one injection well and more than one production well. There may be many different spatial relationships between injection wells and production wells. Injection wells may be located around a production well. Alternatively the injection wells may be in two or more rows between each of which are located production wells. These configurations are termed "pattern flood", and the person skilled in the art will know how to operate the injection wells to achieve maximum oil recovery during the water flood treatment (secondary or tertiary recovery). Where the injection fluid is injected into the reservoir via an injection well having two or more associated production wells, the pore volume of the injection fluid will be swept volume between the injection well and the two or more production wells. The person skilled in the art will understand that depending on the spatial arrangement of the injection well and its associated production wells, the injection fluid may break-through into each production wells at different times.

The invention may be operated on-shore or off-shore. The greater control over polymer usage, and the more efficient use of polymer which is envisaged by the invention, may enable more off-shore sites to use polymer flood technology in EOR operations.

Computer-Implemented Method and System

In order to determine optimum settings of various components of an oil recovery system, the system is simulated by means of one or more models, as described in international publication no. WO2010/139932 (the contents of which are incorporated herein by reference). Each of the models may be dedicated to a specific part of the recovery system.

A reservoir model, which, as known in the art, is a conceptual 3-dimensional construction of a reservoir that is constructed from incomplete data with much of the interwell space estimated from data obtained from nearby wells or from seismic data, may be employed. The reservoir model uses a predetermined set of rules in conjunction with the relevant input data to generate required output data. In conjunction with this, a reservoir simulation, that is, a computer model that predicts the flow of fluids through porous media (and is therefore based on the reservoir model) may be employed.

A predictive model, as described further below, can predict the amount of incremental oil displaced from the reservoir rock. Using the reservoir model, the reservoir simulation can use information such as the volume and shape of the reservoir (including the arrangement of overlying rock formations and the locations of any faults or fractures in the rock formations), the porosity of the oil-bearing rock formations, the permeability of the oil-bearing rock formation(s) in different directions (including the relative permeabilities to oil and water), the initial oil saturation of the oil-bearing rock formation(s), the location of production well(s) and injection well(s), the predicted sweep (the volume of the reservoir swept by an injection fluid that is injected down the injection well(s)), in combination with the results of the predictive model, to provide an indication as to how much of the predicted displaced oil can be recovered at the productions well(s). The models are preferably executed by a processing system, for example a control system on a platform, which can comprise conventional operating system and storage components.

The additional or incremental amount of oil that is predicted by the predictive model is an amount, in terms of, for example, a percentage, fraction or volume, of oil that will be displaced or recovered compared with a predetermined volume of oil, which is input into the predictive model. The predetermined volume of oil may comprise a "base" oil displacement (or recovery) volume, which is calculated by running a simulation of a "base waterflood" using the reservoir model. This base value reflects the oil that could be either recovered or displaced (both calculations are possible by the reservoir model) based on the physical parameters of the injection fluid (such as injection pressure, volume of the injection fluid, and injection rate) and on physical parameters of the particular reservoir(s) (such as reservoir pressure, porosity and permeability of the formation rock). Typically, the additional or incremental amount of oil is expressed as a percentage or fraction of the predetermined base value. Alternatively, the additional or incremental volume of oil may be calculated using the predictive model based on a predetermined volume of oil that represents the original volume of oil calculated or estimated to be in place in the reservoir before any displacement or recovery of oil (before primary recovery), or immediately before the proposed injection of the injection fluid (for example, after primary recovery or after secondary recovery with a different injection fluid).

By using the results of the predictive model and running the reservoir model to simulate recovery of the displaced oil at the production wells, the reservoir model predicts a residual oil saturation that will be achieved by waterflooding the reservoir using the injection fluid comprising a viscosifying polymer in a low salinity water, and compares this residual oil saturation with an oil saturation of the reservoir that would have been achieved using an injection fluid comprising a low salinity water alone or an injection fluid comprising a viscosifying polymer in a higher salinity water, thereby providing a prediction of the incremental oil recovery.

The model is able to predict incremental oil recovery for each of these EOR techniques (compared with a baseline high salinity waterflood, for example, a seawater flood). However, the injection fluid comprising a viscosifying polymer in a low salinity water is likely to give incremental oil recovery over a low salinity waterflood or a polymer flood using a viscosifying polymer in a high salinity water.

Measurement data received by receiving means of the system are based on measured chemical characteristics of the oil reservoir environment and of the injection fluid, as explained further below. The measurement data may comprise specific measured chemical values as directly measured by suitably positioned measurement equipment, or ratios of values of chemical characteristics, or may comprise values derived from a number of separate chemical characteristic measurements, according to known techniques.

In order for the predictive model to generate data indicative of a predicted amount of incremental displaced oil that will be achieved by configuring the crude oil displacement system so as to inject the injection fluid (comprising a viscosifying polymer in a low salinity water) having the measured chemical characteristics into the reservoir, measurement data associated with certain chemical characteristics of the injection fluid, rock formation, formation water and crude oil should be input into the model. These chemical characteristics include: the whole rock clay content of the reservoir rock, which can be determined by X-ray diffraction (XRD), scanning electron microscopy (SEM) or infrared scintillation point counting; the mineral content of the clay fraction of the rock, in particular, clays of the smectite type (such as montmorillonite), pyrophyllite type, kaolinite type, illite type and glauconite type, which can be determined by X-ray diffraction (XRD) or scanning electron microscopy (SEM); the American Petroleum Institute (API) gravity (relative density) of the oil; the total acid number (TAN value, a measurement of acidity) of the oil; the content of asphaltene and resin components of the oil; the oil viscosity at reservoir pressure and temperature; the viscosity of the stock tank crude oil (the oil that has been separated at the production facility) at standard conditions (for example, the viscosity measurement may be made at 20° C., 25° C. and 30° C.); the total dissolved solids content (TDS) of the formation water, the concentration of multivalent cations of the formation water; the concentration of multivalent cations of the proposed injection fluid; the TDS content (indicating the salinity) of the proposed injection fluid; the viscosity of the proposed injection fluid comprising a viscosifying polymer in an aqueous base fluid, which can be calculated by the model as a function of polymer concentration, polymer molecular weight, polymer type (chemical structure), shear rate under reservoir conditions and salinity of the aqueous base fluid; transport parameters such as polymer adsorption onto the reservoir rock, in particular, onto clay minerals, permeability reduction, cation exchange between Na and Ca sites of the clays and injection fluid, and inaccessible pore volume.

Other preferred or more specific chemical characteristics which may be measured to provide the measurement data input into the model are: a whole rock XRD analysis of the rock formation, including all mineral types in reservoir rock (including clays, and transition metal compounds, such as oxides and carbonates, for example, iron oxide, siderite, and plagioclase feldspars); the zeta potential of the rock; the base number of the oil; a total oil SARA analysis (SARA stands for saturates, aromatics, resins and asphaltenes and is a full evaluation of how much of each type of oil component is present in a sample); the magnesium, calcium, barium and/or iron concentration of the formation water; the pH of the formation water; the magnesium, calcium, barium and/or iron concentration of the injection fluid; and the pH of the injection fluid.

Additional parameters can be taken into account as required in order to configure the predictive model. Some additional parameters that may be considered are: pour point temperature of the oil (° C.); cloud point temperature of the oil (° C.); density of the oil at 15° C. (g/ml) or at some other standard temperature; boiling point distribution of the oil (wt %); boiling point distribution of the oil (° C.); total nitrogen content of the oil (ppm wt); basic nitrogen content of the oil (ppm wt); surface tension of the oil (mN/m); oil/salt water interfacial tension (mN/m); and oil/fresh water interfacial tension (mN/m).

The predictive model may be populated with data obtained using existing coreflood data and single well chemical tracer (SWCT) test data which are used to validate the model. The system software then determines correlations between the chemical characteristics and the displaced oil and uses these correlations to predict displacement of oil from the pore space of the formation rock of a modelled reservoir and, if run in conjunction with the reservoir model, the incremental oil recovery for the modelled reservoir.

Based on the predicted data, which preferably indicate a value for the incremental oil displacement as a percentage of the volume of oil indicated by the data input into the predictive model, the system can determine an optimum or suggested operating mode, and typically takes additional data into account when doing so. This additional data may include data regarding the necessary volume of injection fluid that can be provided and injected into the reservoir via the fluid injection well, and any technical constraints or resource requirements that may affect the provision of the injection fluid, such as the requirement to use desalination equipment to produce the required volume of injection fluid or polymer cost. In general, an injection fluid comprising a viscosifying polymer in a low salinity is either passed continuously into the formation or preferably a slug of the injection fluid of controlled pore volume (PV) is passed into the formation.

The application of the computer-implemented method and system is advantageous where a limited supply of naturally occurring injection fluid having an optimal or required salinity and/or optimal or required multivalent cation content is present, and/or any desalination equipment produces a limited supply of injection fluid having an optimal or required salinity and/or an optimal or required multivalent cation content, or the polymer cost means that there is a limited supply of the injection fluid comprising a viscosifying polymer in a low salinity water available. The application of the computer-implemented method and system is also advantageous where the volume of the optimal injection fluid that can be injected into one or more reservoirs or wells is limited owing the need to dispose of produced water by injecting the produced water into the reservoir(s) or well(s).

The operating point can comprise an instruction to inject the injection fluid into one or a plurality of selected wells. In one example, where a limited volume of a viscosifying polymer and/or a limited volume of low salinity water for use as injection fluid is available ("low salinity water" is as defined above), the predicted data generated by the model may indicate that a particular well is predicted to yield an incremental oil recovery of 8% based on the original oil in place in the reservoir, while values of 12% and 4% are predicted for other wells of the reservoir. The system software can be configured to order or rank the wells in priority order based on these production results, and the predictive model or other system software (such as the reservoir model) used in determining the operating mode can take into account factors such as the initial oil saturation of each reservoir (initial oil in place), an available volume of the injection fluid and the slug volume required to displace the incremental oil for production at each well.

The system software can also be configured to provide a modified ranking of the producing wells that takes into account the incremental oil displacement that would be achieved using the injection fluid comprising a viscosifying polymer in a low salinity water, and the incremental oil displacement that would be achieved using the produced water, a blend of the low salinity water and produced water, or the viscosifying polymer in the produced water as the injection fluid, taking into account the available volume of the injection fluid comprising a viscosifying polymer in a low salinity water and the volume of e.g. produced water that it is desired to re-inject.

A further example of an application of the computer-implemented method and system will now be described. It is known that the chemical properties or characteristics of rock formations, oil and formation water can vary spatially within a single reservoir (both in a vertical and a transverse direction). Thus, where the reservoir comprises two or more overlying oil-bearing rock formations (hereinafter referred to as overlying sections of a reservoir), these overlying sections may have different chemical characteristics (owing to differences in the chemical characteristics of the rock formations, or to differences in the chemical characteristics of the crude oil or of the formation water contained within the pores of the rock formations). The overlying sections of the reservoir may have different initial oil saturations (also referred to as initial oil in place). Also, chemical properties or characteristics of a rock formation, oil and formation water can vary across a layer of a reservoir such that different chemical properties or characteristics can be measured at different locations. The initial oil saturation may also vary across a layer of a reservoir. Considering a reservoir having a plurality of injection wells at different positions in the reservoir, the computer-implemented method can determine an operating mode comprising an indication of which of the wells the injection fluid (the injection fluid comprising a viscosifying polymer in a low salinity water), having measured chemical characteristics on the basis of which measurement data has been input into the predictive model, should be injected into in order to maximise the incremental oil displaced and hence potentially recovered. Thus, the predictive model may include measurements of the chemical characteristics of the reservoir rock, oil and formation water in different overlying layers of a reservoir as well as including measurements of such chemical characteristics at different locations within a layer of the reservoir.

For example, in the case of tertiary recovery with an injection fluid comprising a viscosifying polymer in a low salinity water, there may be poorly swept regions of the reservoir. By using the predictive model in conjunction with geographical data obtained using the reservoir model, the system can determine as operating mode(s) areas of the reservoir that should be targeted for additional waterfloods. The operating mode may comprise a selection of wells that are likely to target these poorly swept regions when injected with the injection fluid comprising the viscosifying polymer in a low salinity water. Additionally, on the basis of reservoir permeability data, the regions of a reservoir that are most likely to be bypassed if flooded with a non-viscosified injection fluid, and which are likely to result in an additional displacement of oil if flooded with the injection fluid comprising the viscosifying polymer in a low salinity water, can be determined. Based on this determination, a selection of injection wells for further injection, the locations of injection wells for new oil fields, or the locations of infill wells for existing reservoirs may be determined by the system software.

The computer-implemented method and system is particularly advantageous where, for example, a viscosifying polymer in a low salinity water for use as injection fluid is in limited supply, and the predictive model can be employed as described above to order or rank the wells to be injected in priority order. The predictive model or other system software used in determining the operating mode can use predetermined rules to take into account factors such as the available volume of injection fluid and the slug volume required to displace this incremental oil for each section of the reservoir in which the oil and/or formation water chemical characteristics and/or permeabilities measured vary.

The chemical characteristics may vary across a reservoir section. Accordingly, the predictive model can be used to rank injection wells that are arranged at different locations in the reservoir and that penetrate the section of reservoir. The predictive model may therefore determine an operating mode where the viscosified low salinity water is used as injection fluid for one or more but not all of the injections wells that penetrate the section of reservoir.

The reservoir model or a reservoir simulation can be used in combination with the predictive model described above to provide additional valuable information. This information can also be used to predict when and where optimal recovery of the oil will take place. Based on such predicted data, optimum locations for injection wells and/or production wells can be predicted, allowing the layout of a reservoir or even an entire oilfield to be planned to allow optimal efficiency in oil recovery. The predicted data can also be used to predict optimum locations of infill injection wells for injection with the injection fluid comprising the viscosifying polymer in a low salinity water.

Modelling Studies of Simulations of Combined Low-Salinity Waterflood and Polymer Flood Model Description In a first study, LandMark's commercially available "VIP" reservoir simulator was used to model the combination of low-salinity waterflood and polymer flood processes. The key features of the low-salinity model, as described by Jerauld et al. (Jerauld, G. R., Lin, C. Y., Webb, K. J., and Seccombe, J. C. (2008) Modeling Low-Salinity Waterflooding, *SPE Reservoir Evaluation and Engineering*, paper SPE 102239, December, 1000-1012), are:

1. Salt is modeled as an additional single-lumped component in the aqueous phase, which can be injected and tracked. The viscosity and density of the aqueous phase is dependent on salinity.
2. Relative permeability and capillary pressure are made a function of salinity. This dependence disappears at high and low salinities. High- and low-salinity relative permeability curves are inputs to the model. Shapes for the permeability curves are interpolated in between these high and low salinities. The dependence on salinity is taken to be irreversible so that the lowest salinity attained defines the relative permeability.
3. Portions of the connate water are made inaccessible, to demonstrate the impact of the banking of connate water on the process.
4. Hysteresis between imbibition and secondary-drainage water relative permeability is included to model oil-bank development accurately.
5. A model of dispersion within the water phase is included to enable more rigorous study the impact of dispersion.

The polymer model for polymer rheology, chemistry and transport in the VIP reservoir simulator is the same as early versions of the UTCHEM model (The University of Texas Chemical Compositional Simulator, Camilleri et al.—Camilleri, D., Engelsen, S., Lake, L. W., Lin, E. C., Ohno, T., Pope, G. and Sepehrnoori, K. (1987) Description of an Improved Compositional Micellar/Polymer Simulator, *SPE Reservoir Engineering*, November pp 427-432; Camilleri, D., Fil, A., Pope, G. A., Rouse, B. A. and Sepehrnoori, K., (1987) Improvements in Physical-Property Models Used in Micellar/Polymer Flooding, SPE, Reservoir Engineering, November pp 433-440). The key features of the polymer model are:
1. Polymer solution viscosity is a function of polymer concentration, shear rate and salinity. Temperature effects on polymer viscosity are not directly modeled.
2. All transport parameters, such as polymer adsorption, permeability reduction, cation exchange and inaccessible pore volume are considered.
3. Other effects, such as polymer degradation in mixing and in surface facilities, and in wells and injection lines are accounted for external to the model.

Simulations

One Dimensional (1D) Simulation Study.

Figure 3:
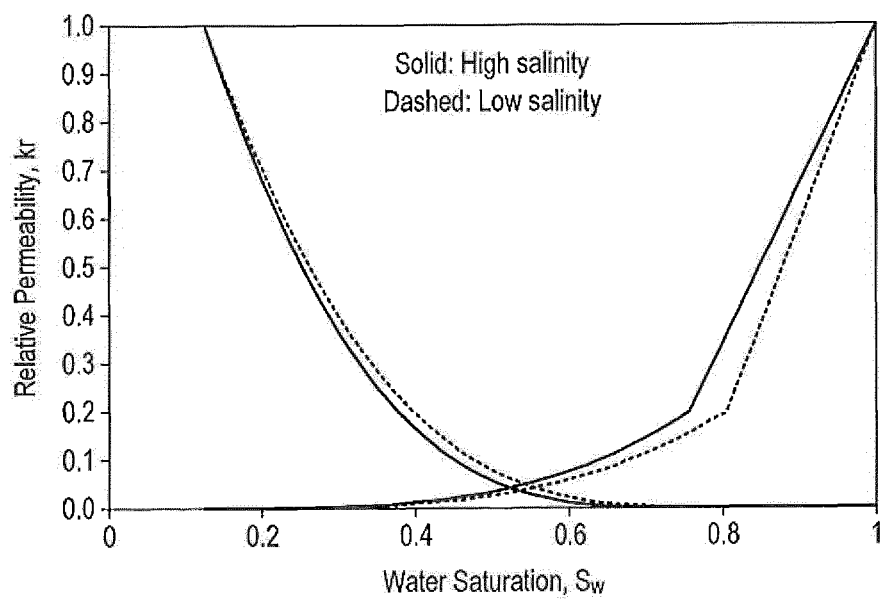
FIG. 3 shows relative permeability curves for high and low salinity brines.

1D simulation runs were conducted to study the effect of combining low-salinity waterflood and polymer flood processes on displacement efficiency. Without wishing to be bound by any theory, it is believed that the low salinity water and polymer both affect the 1D displacement of oil for different reasons. A low salinity waterflood changes the shape of the relative permeability curve due to wettability changes toward more water-wet rock as shown in FIG. 3. Low salinity relative permeability is estimated from high salinity relative permeability by end-point scaling. An additional oil recovery of 15% is applied to construct the low salinity relative permeability curve based on some typical X-Ray Diffraction (XRD) prediction tool results. Incremental recovery over a base-line high salinity waterflood is calculated as:

$$\frac{Sor(\text{high}) - Sor(\text{low})}{1 - Swi - Sor(\text{high})} \quad (1)$$

where $S_{or}$ is the residual oil saturation and $S_{wi}$ is the connate water saturation.

Figure 4:
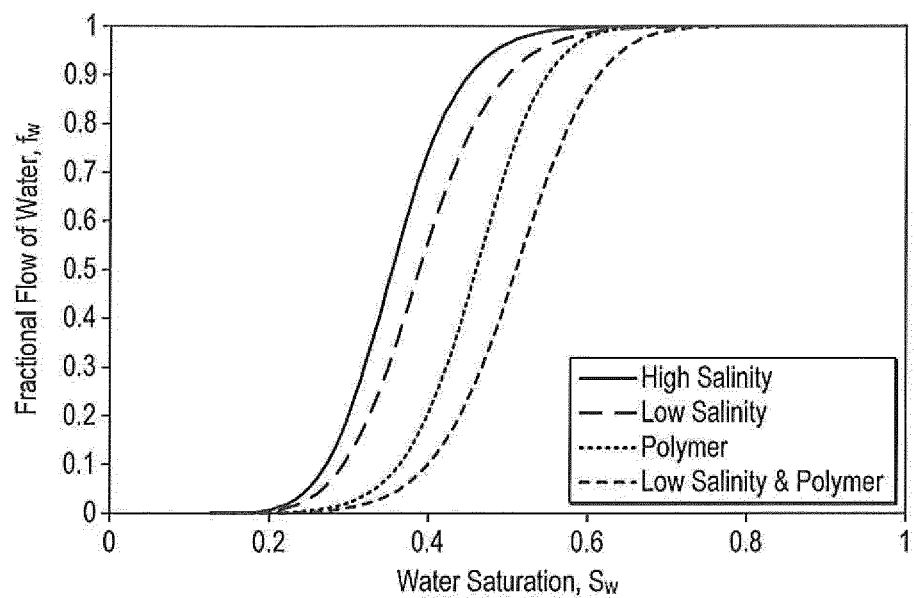
FIG. 4 shows a comparison of fractional flow of water for a high salinity waterflood, low salinity waterflood, a polymer flood and a combination of a low salinity and polymer flood.

Addition of polymer to an aqueous fluid changes the mobility ratio due to the increase of water viscosity and a permeability reduction factor. Both low salinity waterfloods and polymer floods improve the fractional flow towards a more favourable case compared to a high salinity waterflood (Lake, L. W. (1989) *Enhanced Oil Recovery*, (314-353) London: Prentice-Hall). The combination of these two methods further improves the fractional flow behaviour resulting in better displacement efficiency as shown in FIG. 4.

There are 25 grid blocks in the 1D model between the injector and producer to ensure that there is a realistic level of dispersivity (modelled herein with numerical dispersion). Chloride anion ($Cl^-$) and calcium cation ($Ca^{2+}$) concentrations in the high salinity brine are selected to be about the same levels as in sea water, 20,632.5 and 1,000 ppm, respectively. Low salinity brine composition is one tenth of high salinity concentration, thus having $Cl^-$ concentration of 2063.2 ppm and $Ca^{2+}$ concentration of 100 ppm. The salinity thresholds are based on calcium concentration when the brines are used in conjunction with polymer in the simulation model; in this case 10316 ppm $Cl^-$ and 500 ppm $Ca^{2+}$ for high salinity brine, and 4126 ppm $Cl^-$ and 200 ppm $Ca^{2+}$ for low salinity brine. Based on polymer rheological data, the polymer concentration requirement for a 10 cP viscosity oil is three times higher for a high salinity brine compared to a low salinity brine. These polymer concentrations that are selected for the high and low salinity brines create a polymer viscosity of about 3.5 cP which is sufficient for a stable displacement of the oil by the injection fluid. As discussed below, the benefit of including polymer in the injection fluid comes from the improvement in fractional flow behaviour as opposed to macroscopic sweep efficiency. Therefore, a stable displacement of oil even the in one-dimension case is required.

Figure 5:
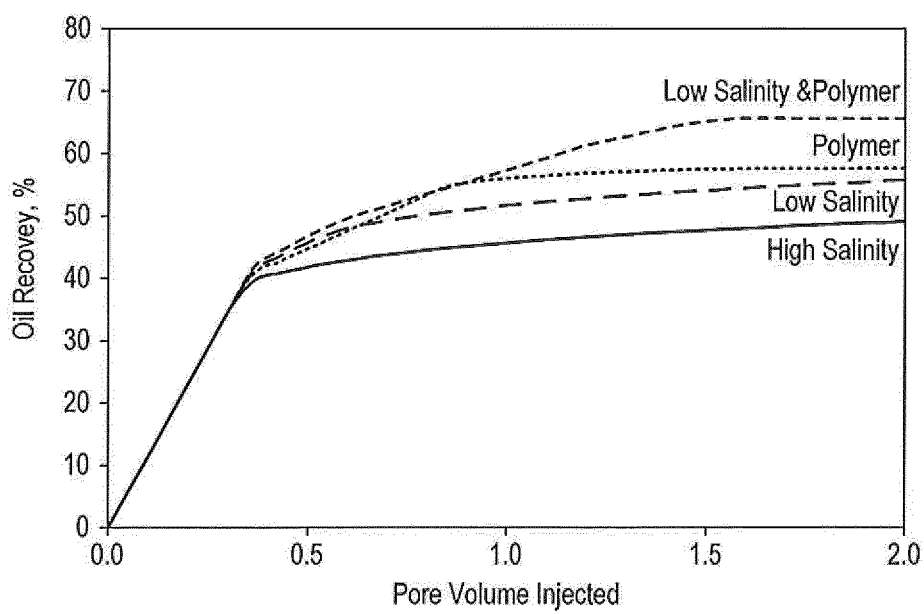
FIG. 5 shows a comparison of oil recovery for different EOR techniques; Oil recovery using a combination of low salinity and polymer flooding is as much as the summation of the individual processes.
Figure 6:
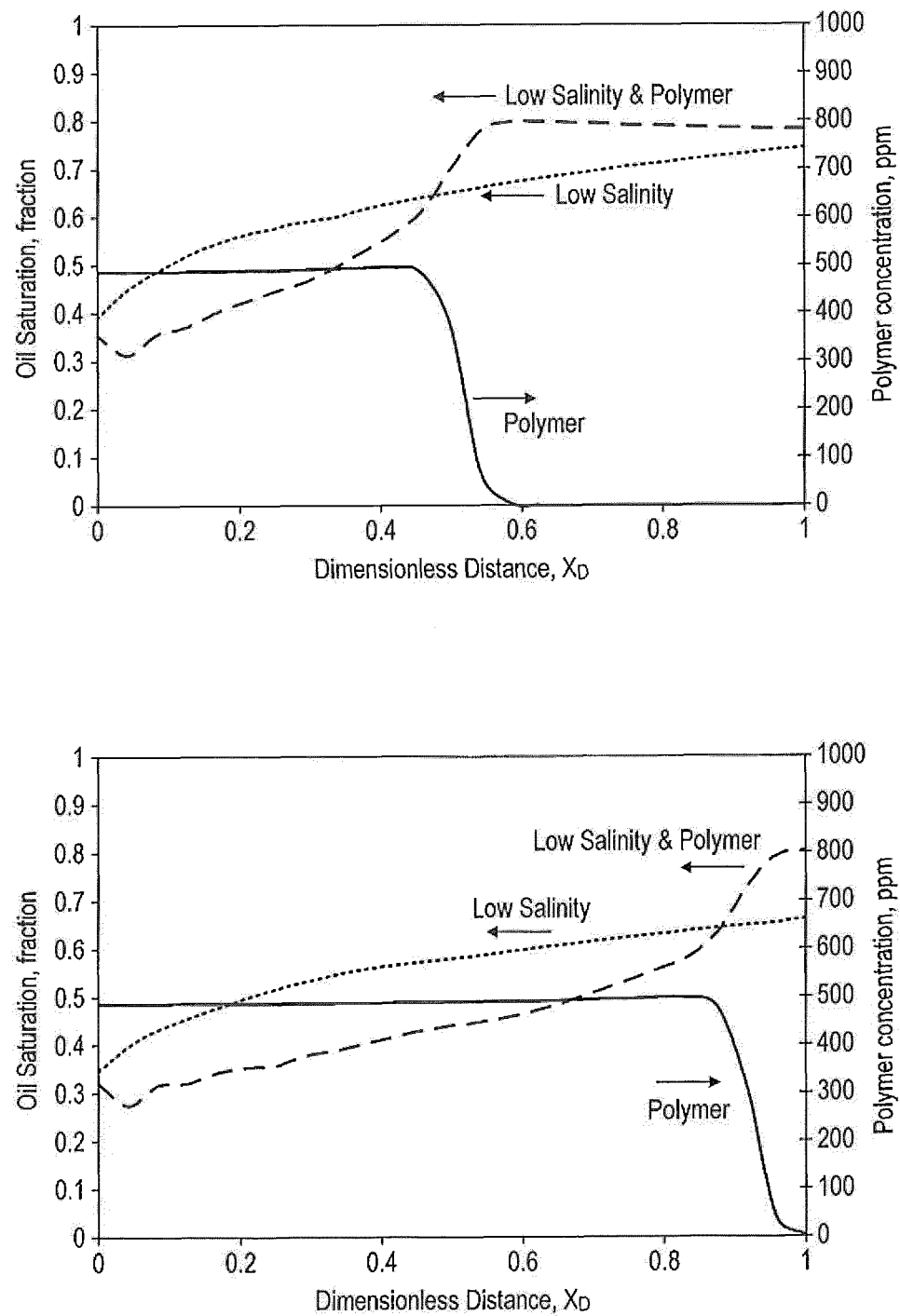
FIG. 6 shows a comparison of oil saturation maps for low salinity waterflooding and a combination of low salinity and polymer flooding for 0.5 (above) and 1.0 (below) pore volumes (PV) of injected fluid.

In one example, a 1.0 PV slug of a low salinity brine and/or of polymer in a low salinity brine is injected followed by a high salinity brine. Comparison of incremental oil recoveries for all these cases is shown in FIG. 5. The ultimate oil recovery (at 2.0 PV) for a combined low salinity waterflood and polymer flood is almost as much as the summation of these individual processes. FIG. 6 shows the polymer concentration and oil saturation profile comparison for a low salinity waterflood with and without polymer at 0.5 PV and 1.0 PV of injected fluid. Polymer added to the low salinity brine helps improve the displacement efficiency of the flood and displaces more oil compared to the low salinity waterflood alone.

Figure 7:
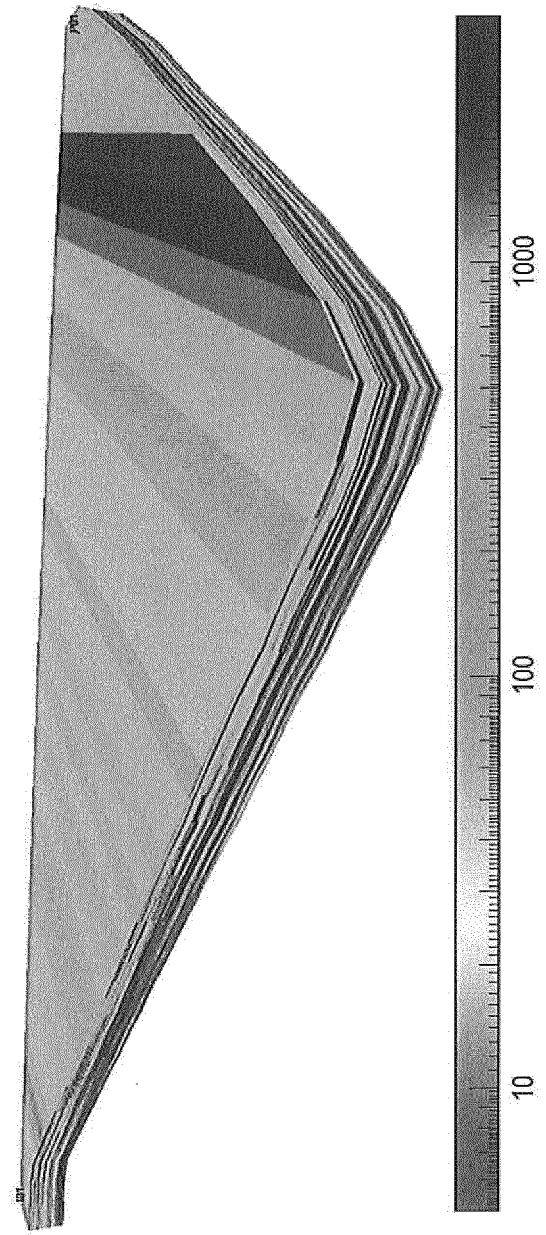
FIG. 7 shows permeability (millidarcies [md]) in a heterogeneous model of a ⅛$^{th}$ of a 9 spot well pattern of injection and production wells. The model is Kite shaped to model the asymmetry of the pattern.
Figure 8:
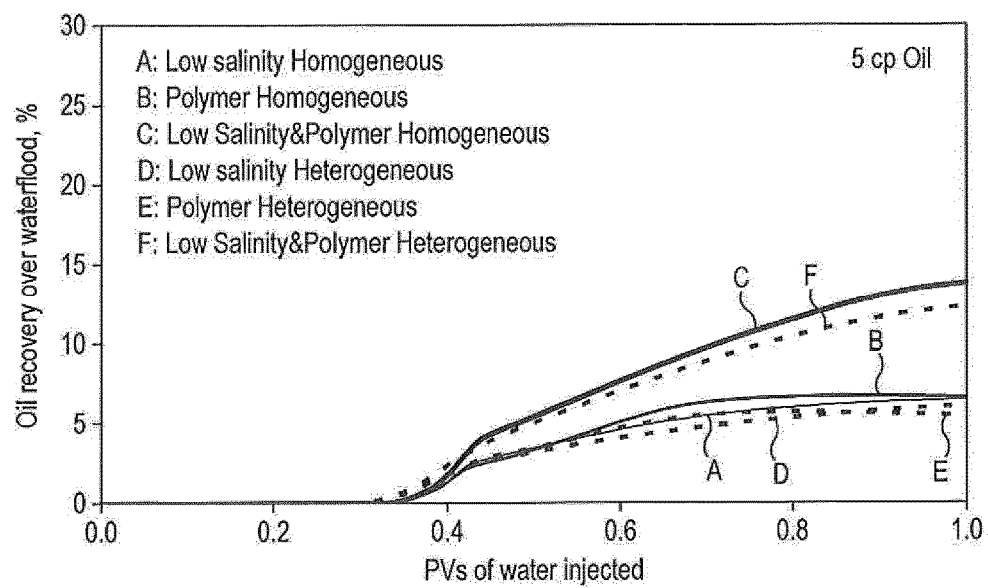
FIG. 8 shows a comparison of incremental oil recovery between heterogeneous (dashed lines) and homogeneous (solid lines) modelled cases for oils having viscosities of 5 and 50 cP.
Figure 8:
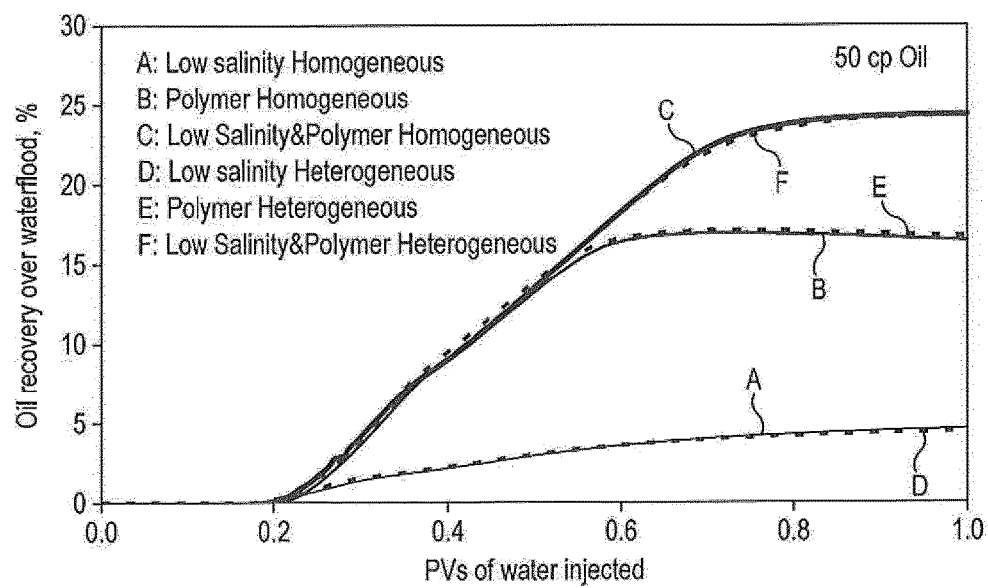
Figure 9:
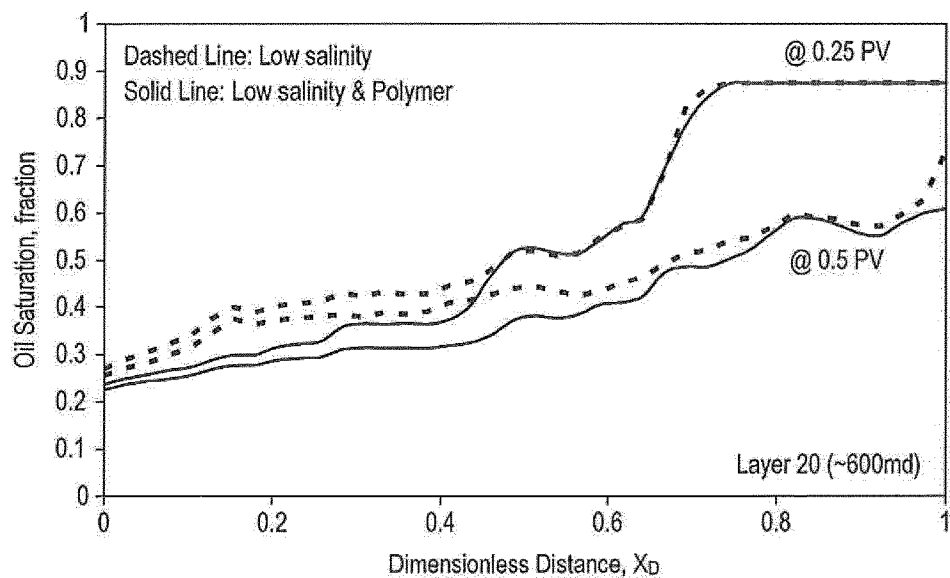
FIG. 9 shows an oil saturation map for a low salinity waterflood with and without polymer in two layers of reservoir rock.
Figure 9:
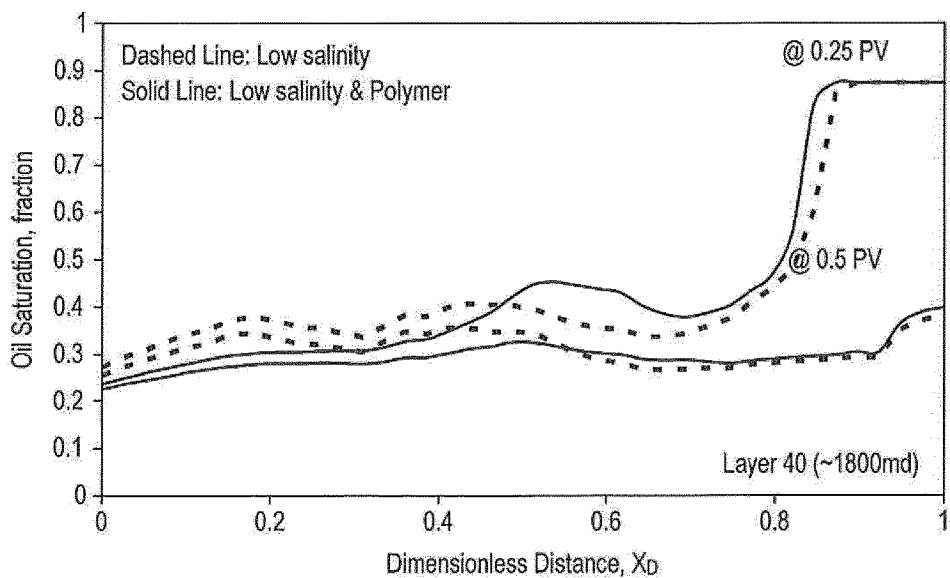

Heterogeneous vs. Homogeneous Cases. A heterogeneous model of ⅛ of a 9-spot (that is, a model having an arrangement of 1 injector and 8 producers in which one pathway is modelled) was chosen to investigate the synergistic behaviour of a low salinity waterflood and polymer flood. This model consists of 44 layers of reservoir rock with a stochastic distribution of permeability in a range between 10 to 4,000 millidarcies (md) as shown in FIG. 7. There is one injector and one producer in this model. Firstly, the comparison between the homogeneous and heterogeneous cases was investigated. The homogeneous case was constructed by harmonic averaging of permeability laterally and then arithmetic averaging vertically for both horizontal and vertical permeabilities. Flood design for various cases was the same as the 1D case. The results obtained for the 5 and 50 cP oils are shown in FIG. 8. Overall, addition of polymer to the low salinity brine for the 50 cP oil shows higher incremental oil recovery than for the 5 cp oil. Incremental oil recovery between the homogeneous and heterogeneous cases is very close, especially at high oil viscosity. At low oil viscosity (5 cp), oil recovery is somewhat higher in the homogeneous case than in the heterogeneous case. To study the contribution of polymer to low salinity EOR on sweep efficiency, the oil saturation map in layer 20 (~600 md) and layer 40 (~1,800 md) are plotted in FIG. 9 at 0.25 and 0.5 PV for the 5 cp oil. It can be seen that the oil saturation front in the combined process tends to slow down in the high permeability layer and speeds up in the low permeability layer very slightly. This does not account for a very significant change on the sweep efficiency, which explains why most of the benefit of adding polymer is believed to be due to 1D displacement efficiency.

Figure 10:
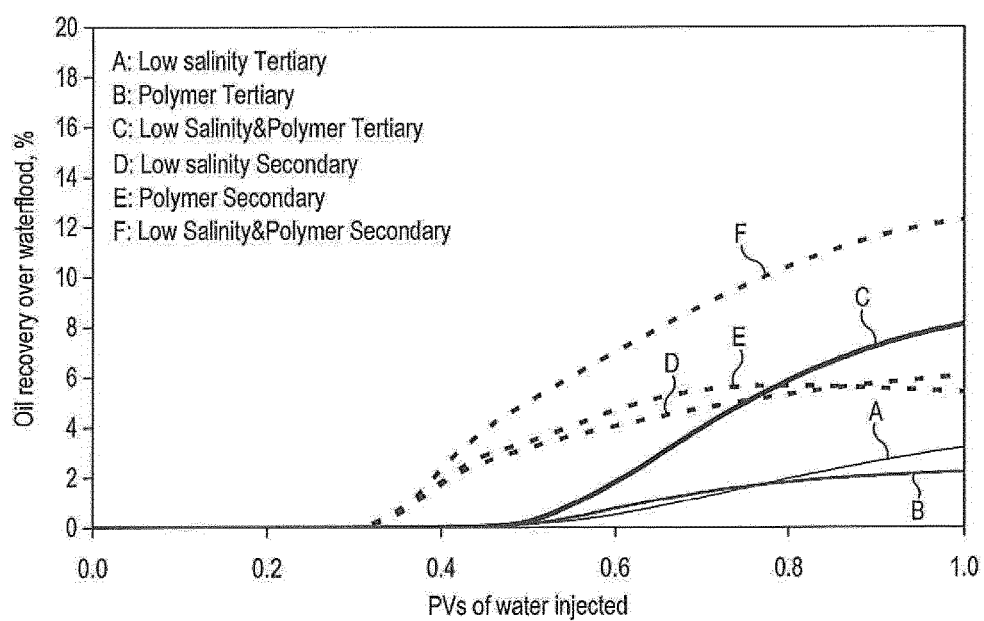
FIG. 10 shows a comparison of secondary vs. tertiary responses of oil recovery for different EOR techniques (for a 5 cP oil).
Figure 11:
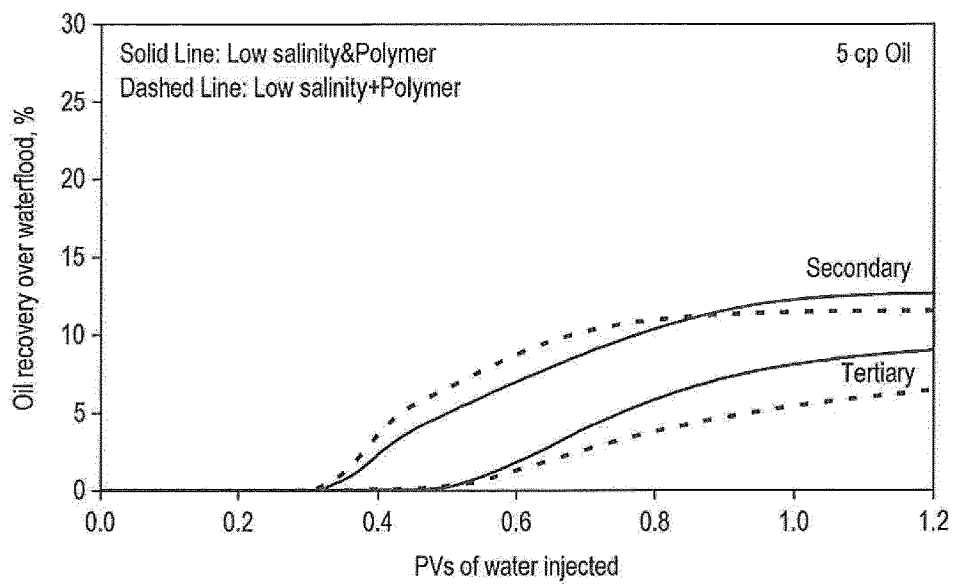
FIG. 11 shows a comparison of synergistic behaviour of a combination of low salinity waterflood and polymer flood under secondary and tertiary recovery conditions for a 5 cP and 50 cP oil.
Figure 11:
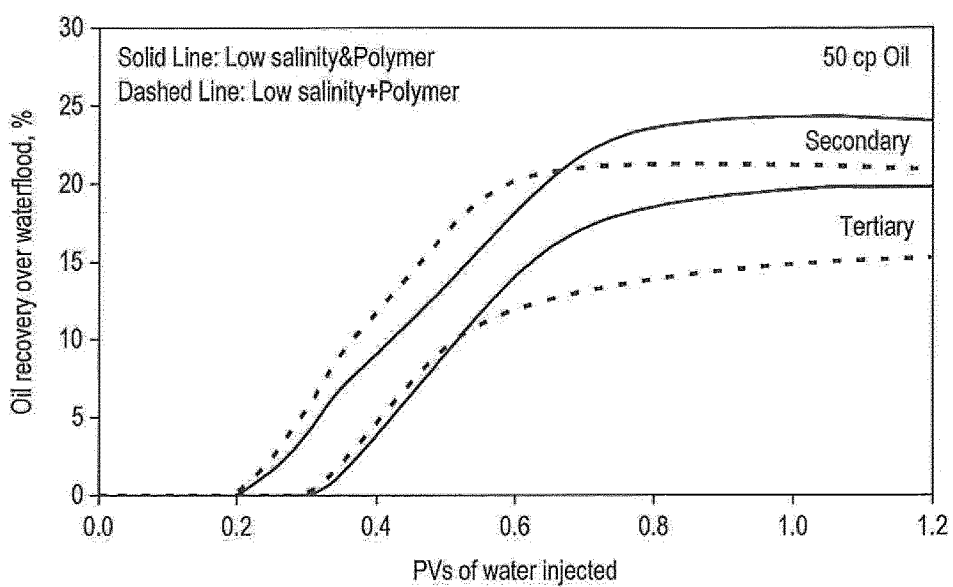

Secondary vs. Tertiary Response. To investigate how use of a low salinity polymer flood in secondary and tertiary recovery modes, compared relative to each other, a series of simulations were run for various EOR techniques and two different oil viscosity cases using the same heterogeneous model of ⅛ of a 9-spot well pattern. In the design of the tertiary flood, 1.0 PV of high salinity water was first injected, followed by 1.0 PV of low salinity waterflood, or a polymer flood (with a high salinity base brine), or the combination of a low salinity water and polymer flood. The same low salinity relative permeability curves were used for both secondary and tertiary cases. FIG. 10 compares the response of secondary and tertiary recovery cases for a 5 cP viscosity oil. For these model results, secondary recovery cases are more effective than the tertiary recovery cases in terms of timing and oil recovery. It was found that for secondary recovery cases, oil responses break through at 0.3 PV compared with 0.5 PV for tertiary recovery cases. FIG. 11 compares the synergistic behaviour of a combination of low salinity waterflood and polymer flood under secondary and tertiary conditions for 5 cP and 50 cP viscosity oils. In all the cases, the ultimate oil recovery of combined processes is higher than the summation of individual processes. Secondary recovery at high oil viscosity (50 cP) gives an ultimate oil recovery higher than for the less viscous oil (5 cP). At early stages of the secondary flood, oil recovery of the combined processes (low salinity polymer flood) falls below the summation of low salinity waterflood and polymer flood. Although the overall oil recovery of the tertiary recovery cases is less than the secondary cases, the combined processes in tertiary flood gives a higher oil recovery than the summation of individual cases at all times. Synergistic behaviour of combined processes in tertiary recovery mode seems to be more effective than in secondary recovery mode.

Figure 12:
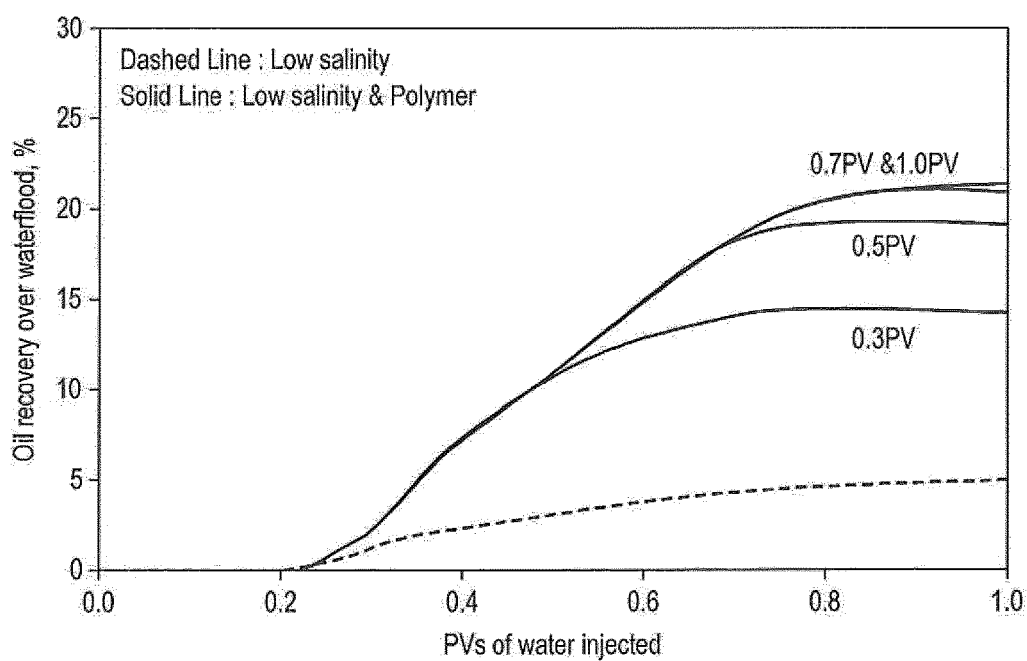
FIG. 12 shows the effect of slug size of a low salinity waterflood with and without polymer on oil recovery.

Slug-Size Sensitivity Study. The effect of slug size of the injected fluid on the recovery was investigated for a low salinity waterflood and a combined low salinity waterflood and polymer flood. The same heterogeneous model of ⅛ of a 9-spot pattern was used for this evaluation. In this model, a slug size of 0.3 PV was sufficient to achieve incremental oil recovery for a low salinity flood. No further benefit in incremental oil recovery was seen above 0.3 PV slug size for a low salinity waterflood. However, addition of polymer to the low salinity flood is effective in achieving incremental oil recovery up to a slug size of 0.7 PV. FIG. 12 shows the comparison of 0.3, 0.5, 0.7 and 1.0 PV slug sizes for a combination of low salinity waterflood and polymer flood. A slug size of 0.3 PV for a combination of a low salinity waterflood and polymer flood gives more than twice the incremental oil recovery compared to a low salinity flood alone for a 50 cP viscosity oil. As slug size increases the incremental oil recovery increases but the rate of recovery begins to decline, especially above 0.5 PV. No significant increase in incremental oil recovery is observed above 0.7 PV.

Chemical Cost Comparison. The cost per barrel of oil recovered (compared with a baseline waterflood) for a polymer flood with a high and low salinity aqueous base fluid was calculated. Table 1 lists the cost per barrel of oil recovered (compared with the baseline waterflood) for a 5 and 50 cP viscosity oil. Based on the results of the simulations, polymer cost for a polymer flood that employs a high salinity aqueous base fluid is about 4 to 6 dollars per barrel of oil recovered (compared with the baseline waterflood). Whereas, the polymer cost per barrel of produced oil (as opposed to incremental oil) reduces to about 1 dollar per barrel of oil. About a 5-fold reduction in chemical cost is predicted when polymer is added to low salinity water.

TABLE 1

Chemical cost comparison of polymer with high salinity and low salinity water.

| Oil Viscosity (cP) | 5 | 50 |
| --- | --- | --- |
| | $/bbl of oil recovered | |
| Polymer Flood (using a high salinity aqueous base fluid) | 5.4 | 4.3 |
| Combined low salinity waterflood & Polymer flood (using a low salinity aqueous base fluid) | 0.6 | 1.1 |

3-D Modeling Case Studies. To provide an independent assessment, a reservoir simulator such as the commercially available "STARS" (Steam, Thermal, and Advanced Processes Reservoir Simulator by Computer Modelling Group Ltd) reservoir simulator software program may be configured to model these EOR processes for another example case. The STARS simulator does not include salinity dependent polymer concentrations, but for continuous injection of low or high salinity water can adequately model low salinity waterflooding, polymer flooding and a combination of these methods. In the STARS simulator, owing to the flexibility in the choice of interpolation parameter and the fact that arbitrary tabular data for relative permeabilities and capillary pressures can be employed, a wide variety of phenomena can be handled; including the ability to interpolate basic relative permeability and capillary pressure data as a function of salinity. A non-linear mixing viscosity function was used to model polymer viscosity as a function of concentration. Dependence of polymer viscosity on water salinity cannot be accounted for in the STARS simulator. The simulator provides a velocity-dependent combined shear thinning and thickening model based on adding the effects of the shear thinning and thickening power law relations. This relationship is bounded by two plateaus; one plateau ensures a Newtonian fluid viscosity for lower velocities, and one plateau ensures a maximum viscosity limit for higher velocities. The STARS reservoir simulator accounts for adsorption of polymer through a Langmuir isotherm correlation and also models the permeability reduction.

Figure 13:
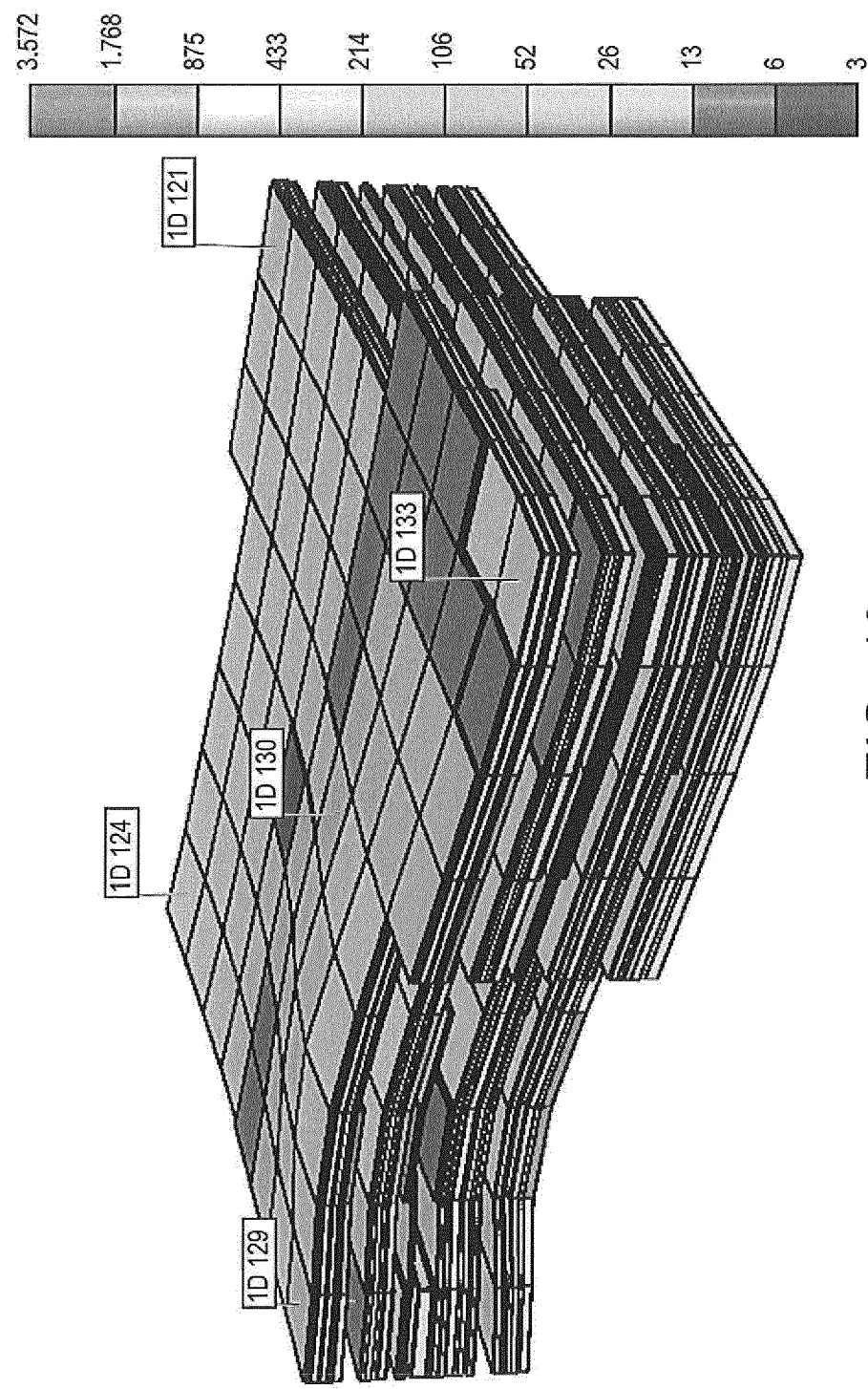
FIG. 13 shows permeability of a 5-spot well pattern reservoir model with one injector and 4 producer wells.
Figure 14:
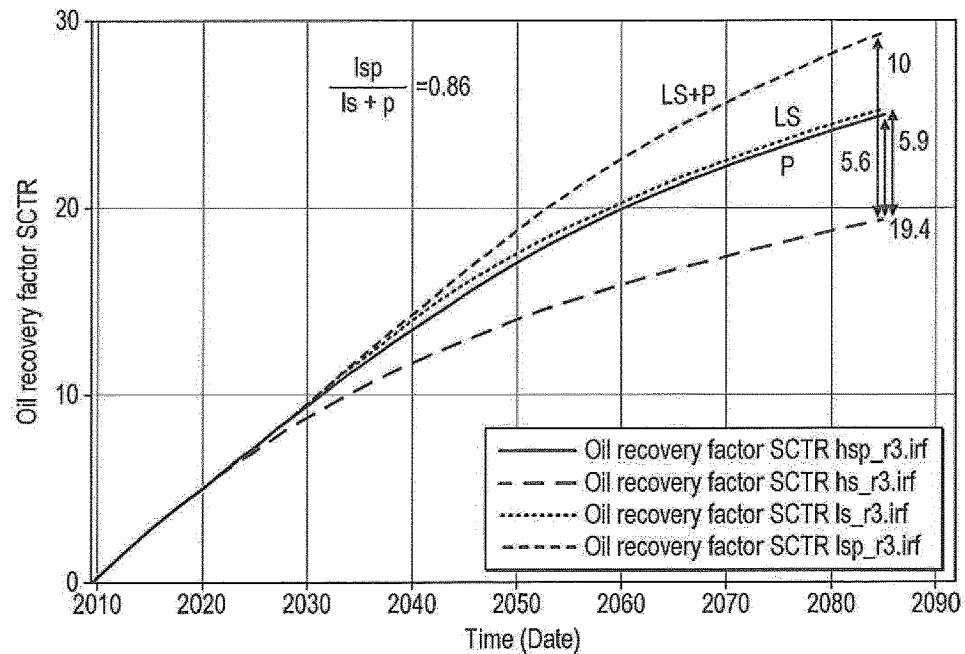
FIG. 14 shows incremental oil recovery for a high salinity waterflood, low salinity waterflood with and without polymer and a polymer flood (with a high salinity base brine) for a 5-spot well pattern reservoir model (above). This model is injectivity limited (below).
Figure 14:
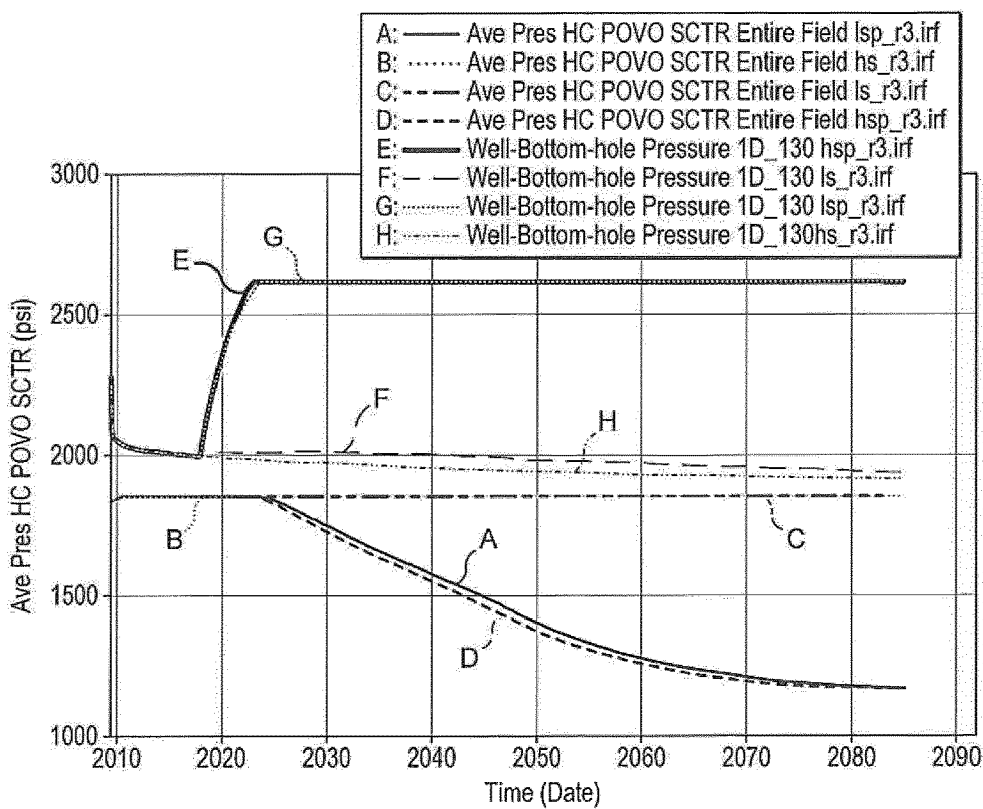
Figure 15:
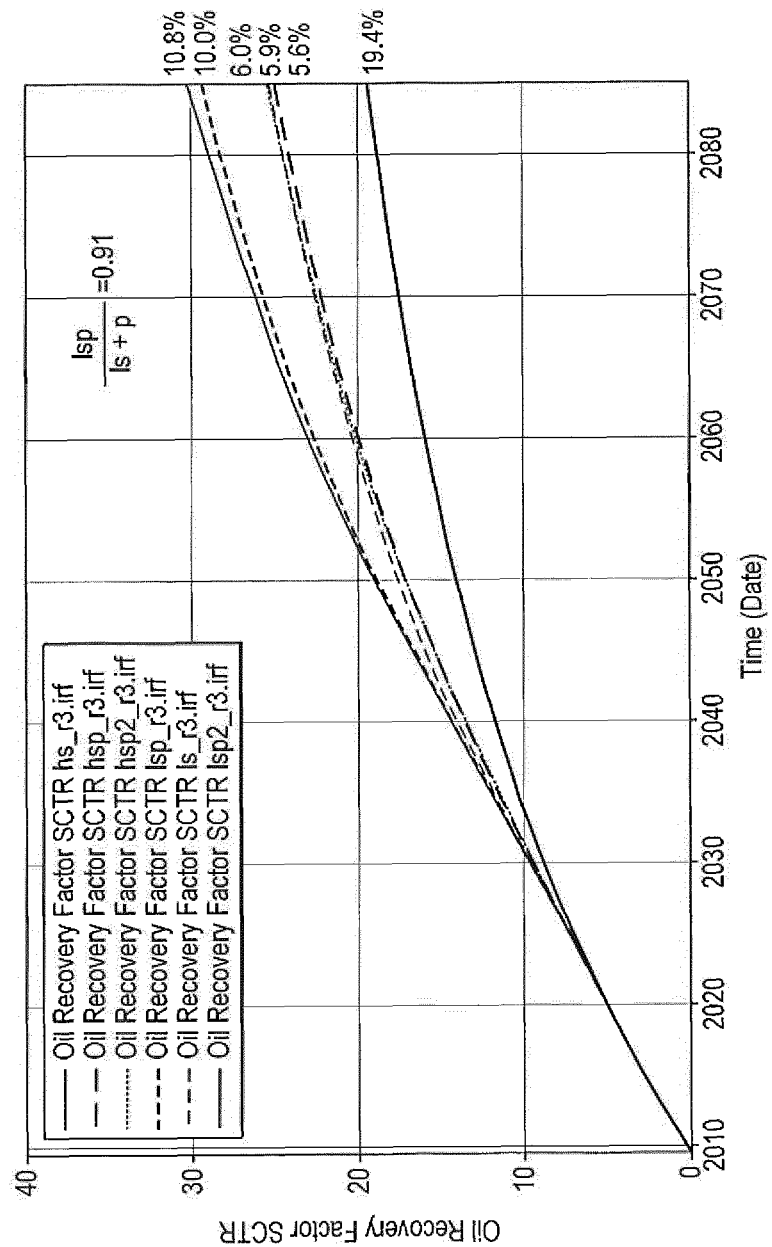
FIG. 15 shows incremental oil recovery for a high salinity waterflood, a low salinity waterflood with and without polymer and a polymer flood (with a high salinity base brine) for a 5-spot pattern reservoir model; this model is not injectivity limited.

In one example, three-dimensional (3D) simulations of a type pattern model were performed for a 50 cP average oil viscosity. This model is heterogeneous with injectivity constraint representing a 5-spot well pattern model with one injector and 4 producers. FIG. 13 shows the permeability of this reservoir model. A variety of options were simulated to study the performance of different EOR techniques including low salinity waterflood, polymer flooding and a combination of these two techniques. High salinity water was injected for about 10 years before implementation of any EOR technique. All the cases were compared with the high salinity waterflood (provides a baseline oil recovery). The ultimate oil recovery for the high salinity flood was 19.4% as shown in FIG. 14. The polymer floods with high and low salinity aqueous base fluids gave 5.6 and 10% incremental oil recoveries over the high salinity waterflood, respectively. In contrast, a low salinity waterflood alone had an ultimate incremental oil recovery of 5.9% over the high salinity waterflood baseline. In this case, with the injectivity constraints, the incremental oil recovery of the combination of low salinity waterflood and polymer flood was not as high as the summation of each method alone. These cases were run with no pressure constraint on the injector to evaluate the synergistic behaviour of these processes with no injectivity limitation. FIG. 15 shows that the oil recovery for the polymer flood with the high salinity aqueous base fluid increased from 5.6 to 6.0% and the oil recovery for the polymer flood with the low salinity aqueous base fluid increased from 10.0 to 10.8%. Removing the injectivity limitation improved the overall synergistic behaviour of a low salinity waterflood and polymer flood.

Figure 16:
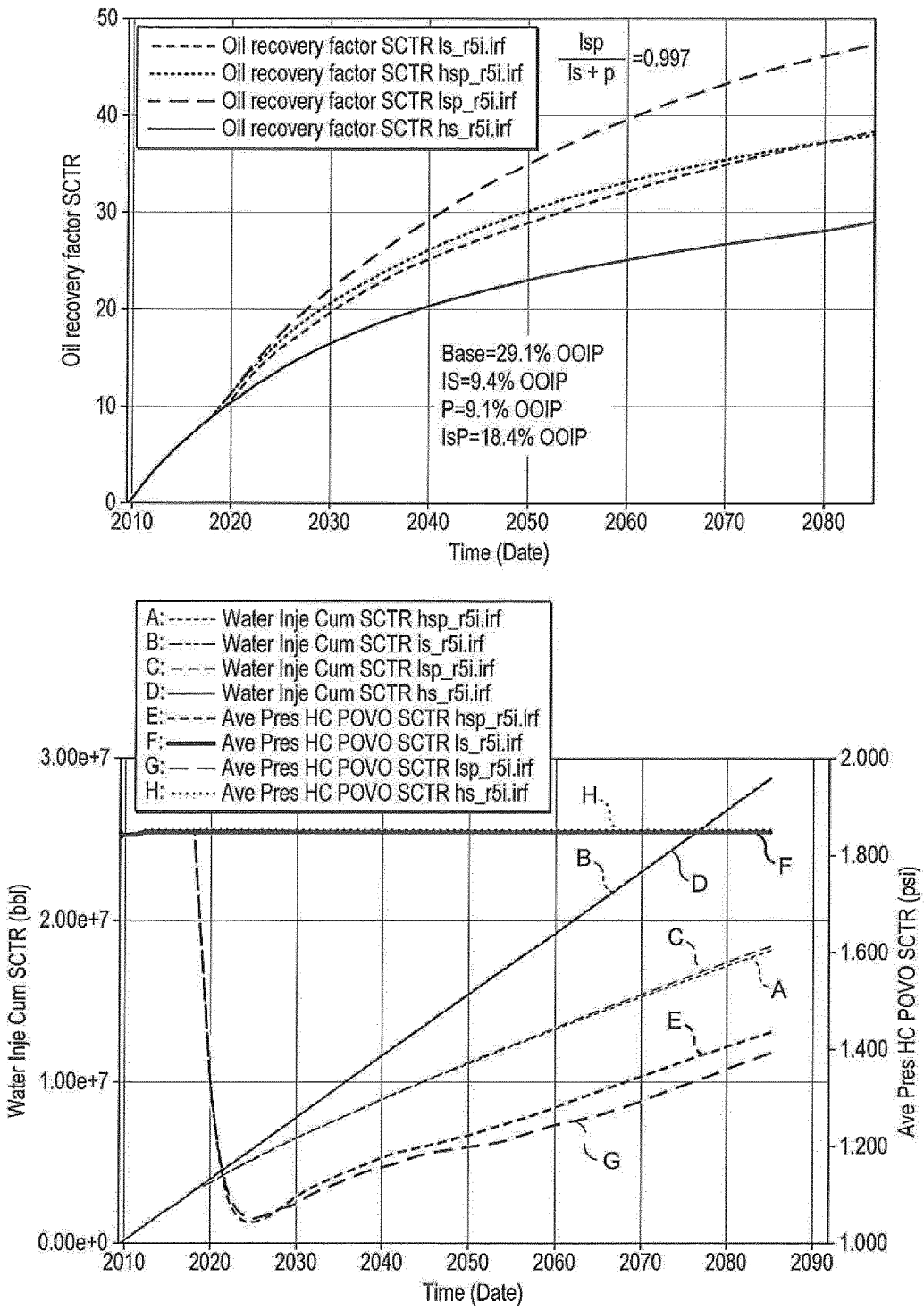
FIG. 16 shows incremental oil recovery for a high salinity waterflood, low salinity waterflood with and without polymer and a polymer flood (with a high salinity base brine) for a 5-spot pattern reservoir model with infill drilling (above). This model is injectivity limited (below).
Figure 17:
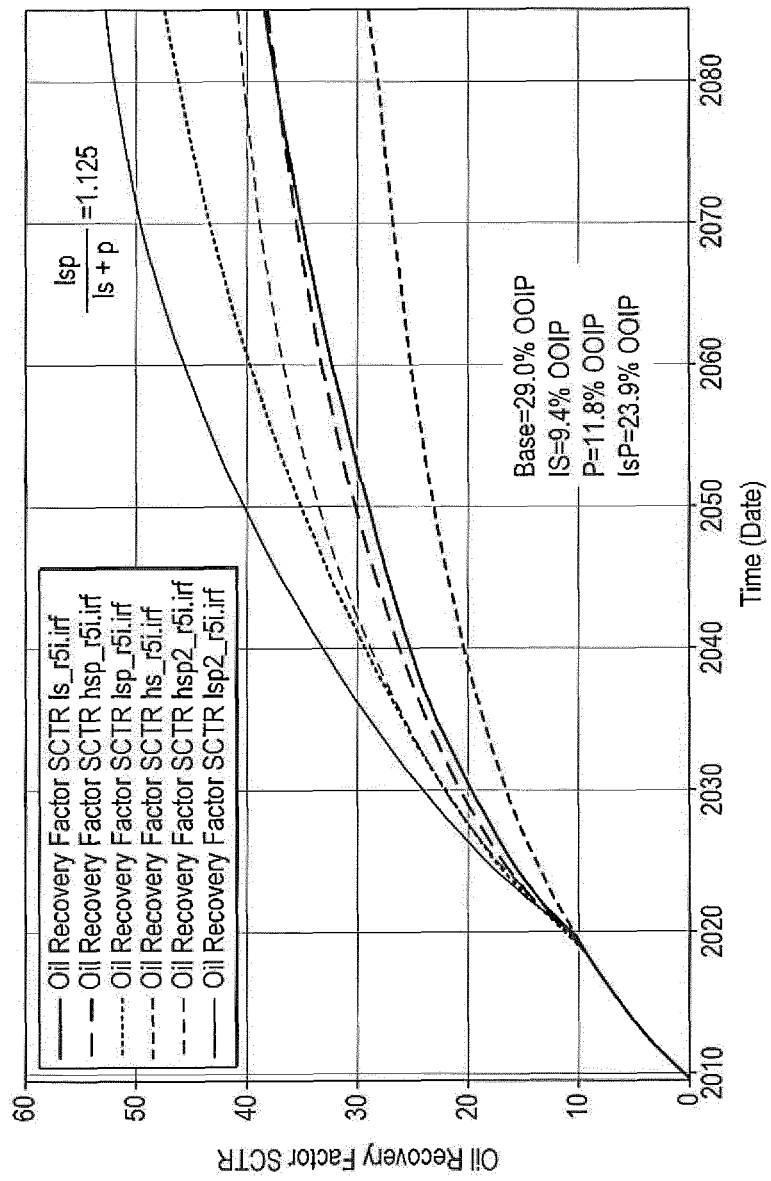
FIG. 17 shows incremental oil recovery for a high salinity waterflood, a low salinity waterflood with and without polymer and a polymer flood (with a high salinity base brine) for a 5-spot pattern reservoir model with infill drilling; this model is not injectivity limited.

Another set of runs was simulated to investigate the effect of infill drilling for different scenarios. New producers were placed at the midpoint between the original injectors and producers, all the original producers were turned to injectors and four more injectors were added between the original corner injectors. The first sets of runs were under injection pressure constraints. As demonstrated in FIG. 16, the baseline high salinity waterflood oil recovery was improved to 29% OOIP (original oil in place) in the infill case. As a result of smaller well spacing, the oil recovery in all the EOR options increased. A low salinity flood gave an incremental oil recovery of 9.4% over the high salinity baseline flood while a polymer flood (using a high salinity aqueous base fluid) gave an incremental recovery of about 9.1% over the high salinity baseline flood. The combination of a low salinity flood and polymer flood increased the incremental oil recovery to 18.4%. The infill drilling helps improve the synergistic behaviour of the combined processes even under injectivity limitation situations. Polymer cases were run with no pressure constraints on injectors to investigate the effect of no injectivity limitation combined with infill drilling (FIG. 17). The incremental oil recovery in the polymer case with low and high salinity brines as the base fluids increased to 23.9 and 11.8%, respectively. Removing the injectivity constraint combined with infill drilling helps improve the synergistic behaviour of these combined processes beyond their individual contributions. Therefore, the effect of the placement of infill wells on incremental oil recovery with a polymer flood that employs a low salinity water as the aqueous base fluid can be modelled.

Conclusions from Modelling Studies:
  One third or less of polymer is required for polymer floods that employ a low salinity water as base fluid compared with using a high salinity water as the base fluid. This fact makes the combination of low salinity waterflooding and polymer very attractive.
  Addition of polymer to a low salinity waterflood improves the timing of the incremental oil recovery and enhances recovery efficiency.
  The incremental oil recovery between the homogeneous and heterogeneous modeled cases is in close agreement, especially for more viscous oils. It is believed that most of the polymer benefit comes from the improvement in fractional flow behavior as opposed to macroscopic sweep efficiency.
  At high oil viscosities, a combination of a low salinity waterflood and a polymer flood gives incremental oil recovery about equal or better than the summation of each flooding technique, if used separately.
  Both secondary and tertiary recovery modes are effective for a viscosified low salinity waterflood, but secondary recovery mode gives better timing of oil recovery.
  Synergistic behavior of combined low salinity waterflood and polymer flood processes is more effective in tertiary recovery modes than secondary recovery mode.
  Chemical cost comparison of the cases studied shows that a 5-times reduction in chemical cost per barrel of oil recovered can be expected for a combined polymer and low salinity flood.
  Injectivity constraints in field application can limit the synergy between these combined processes. Modelling studies can be employed to determine the placement of infill wells to gain the optimum benefit from the synergy between the combined processes.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:
1. A method of recovering oil from a subterranean oil-bearing reservoir using an injection fluid comprising a viscosifying polymer in a low salinity water, the method comprising:
  determining a viscosity of the injection within the reservoir based on at least one of a composition of the viscosifying polymer, a molecular weight of the viscosifying polymer, a concentration of the viscosifying polymer, a composition of the low salinity water, a temperature of the reservoir, or a shear rate of the injection fluid within the reservoir;
  wherein the reservoir is penetrated by one or more injection wells and by one or more production wells, and wherein the reservoir contains oil having a viscosity of from 40 to 200 cP;
  preparing the injection fluid, wherein the injection fluid comprises the viscosifying polymer in the low salinity water, wherein the low salinity water has a total dissolved solids (TDS)content of 15,000 ppmv or less, wherein the ratio of the multivalent cation content of the low salinity water to the multivalent cation content of the connate water of the reservoir is less than 1;
  wherein the determined viscosity of the injection fluid within the reservoir is matched to the viscosity of the oil under reservoir conditions such that a ratio of a mobility of the injection fluid to a mobility of the oil in the reservoir is less than one,
  initiating injection of the injection fluid into at least one of the injection wells, wherein the injection fluid is injected in a slug size in the range of 0.5 to 0.9 pore volumes (PV); and sweeping oil in the reservoir towards at least one of the one or more production wells based on the initiation of the injection of the injection fluid into the at least one of the injection wells.

2. The method according to claim 1, wherein the injection fluid is injected in a slug size of from 0.6 to 0.8 PV.

3. The method according to claim 1 or claim 2, wherein the low salinity water has a TDS content of less than 12,000 ppmv.

4. The method according to claim 1 or claim 2, wherein the low salinity water has a total dissolved solids (TDS) content of at least 100 ppmv.

5. The method according claim 1 or claim 2, wherein the ratio of the multivalent cation content of the low salinity water to the multivalent cation content of the connate water of the reservoir is less than 0.9.

6. The method according to claim 1 or claim 2, wherein the low salinity water that is employed as the base fluid of the injection fluid has a multivalent cation content of less than 200 ppmv.

7. The method according to claim 1 or claim 2, wherein the viscosifying polymer is an acrylamide polymer.

8. The method according to claim 1 or claim 2, wherein the injection fluid is a solution of the viscosifying polymer in the low salinity water.

9. The method according to claim 1 or claim 2, wherein the injection fluid is a dispersion of the viscosifying polymer in the low salinity water.

10. The method as claimed in claim 1 or claim 2 wherein injection fluid comprises at least 500 ppm of the polymer by weight.

11. The method according to claim 1 or claim 2, wherein the mobility of the oil to the in situ mobility of the injection fluid is close to or at 1:1.

12. The method according to claim 1 or claim 2, wherein after injection of the injection fluid, a drive fluid may be injected into the reservoir.

13. The method according to claim 1 or claim 2, wherein a spacer fluid is injected into the reservoir before and/or after injection of the injection fluid.

14. The method as claimed in claim 12, wherein the drive fluid is injected into the reservoir in a greater pore volume than the injection fluid.

15. The method as claimed in claim 14, wherein the drive fluid is injected into the reservoir in a pore volume of at least 1.

16. The method as claimed in claim 1 or claim 2, wherein the injection fluid is injected under pressure into at least one injection well that is spaced from a production well, and passes directly into the oil-bearing rock of the reservoir from the injection well.

17. The method as claimed in claim 12 wherein the injection fluid is injected at a pressure 10,000 to 100,000 kPa (100 to 1000 bar).

18. The method according to claim 1 or claim 2, wherein after injection of the injection fluid, a drive fluid may be injected into the reservoir, which drive fluid sweeps the injection fluid through the reservoir to the production well.

19. The method as claimed in claim 18, wherein the drive fluid is injected into the reservoir in a greater pore volume than the injection fluid.

20. The method as claimed in claim 19, wherein the drive fluid is injected into the reservoir in a pore volume of at least 1.

21. The method according to claim 1 or 2, wherein the injection fluid is injected during secondary recovery.

22. The method according to claim 21, wherein the low salinity water has a TDS content of less than 12,000 ppmv.

23. The method according to claim 21, wherein the low salinity water has a total dissolved solids (TDS) content of at least 100 ppmv.

24. The method according to claim 21, wherein the ratio of the multivalent cation content of the low salinity water to the multivalent cation content of the connate water of the reservoir is less than 0.9.

25. The method according to claim 21, wherein the low salinity water that is employed as the base fluid of the injection fluid has a multivalent cation content of less than 200 ppmv.

26. The method according to claim 21, wherein the viscosifying polymer is an acrvlamide polymer.

27. The method as claimed in claim 21 wherein the injection fluid comprises at least 500ppm of the polymer by weight.

28. The method according to claim 21, wherein the mobility of the oil to the in situ mobility of the injection fluid is close to or at 1: 1.

29. The method according to claim 21, wherein after injection of the injection fluid, a drive fluid may be injected into the reservoir.

30. The method as claimed in claim 21, wherein after injection of the injection fluid, a drive fluid may be injected into the reservoir, which drive fluid sweeps the injection fluid through the reservoir to the production well.

31. The method as claimed in claim 30, wherein the drive fluid is injected into the reservoir in a greater pore volume than the injection fluid.

32. The method as claimed in claim 31, wherein the drive fluid is injected into the reservoir in a pore volume of at least 1.

33. The method as claimed in claim 29, wherein the drive fluid is injected into the reservoir in a greater pore volume than the injection fluid.

34. The method as claimed in claim 33, wherein the drive fluid is injected into the reservoir in a pore volume of at least 1.

35. A method of recovering oil from a subterranean oil-bearing reservoir using an injection fluid, the method comprising;
  determining a viscosity of the injection fluid within the reservoir based on at least one of a composition of the vicosifying polymer, a molecular weight of the vicosifying polymer, a concentration of the vicosifying polymer, a composition of the low salinity water, a temperature of the reservoir, or a shear rate of the injection fluid within the reservoir;
  wherein the reservoir is penetrated by one or more injection wells and by one or more production wells, and wherein the reservoir contains oil having a viscosity of from 40 to 200 cP;
  preparing the injection fluid, wherein the injection fluid comprises the vicosifying polymer in the low salinity water, wherein the low salinity water has a total dissolved solids (TDS) content of 15,000 ppmv or less, wherein the ratio of the multivalent cation content of the low salinity water to the multivalent cation content of the connate water of the reservoir is less than 1, and wherein the viscosity of the injection fluid is in the range of 3 to 200 cP;
  wherein preparing the injection fluid comprises matching the determined viscosity of the injection fluid within the reservoir to the viscosity of the oil under reservoir conditions such that a ratio of a mobility of the injection fluid to a mobility of the oil in the reservoir is less than one;

initiate injection of the injection fluid during secondary recovery into at least one of the injection wells in a slug size in the range of 0.4 to 1.5 pore volumes (PV);

sweeping oil in the reservoir towards at least one of the one or more production wells.

36. The method as claimed in claim 35, wherein the injection fluid is injected in a slug size of from 0.5 to 1.0 PV.

37. A method of recovering oil from a subterranean oil-bearing reservoir using an injection fluid, the method comprising:

preparing the injection fluid, wherein the injection fluid comprising a vicosifying polymer in a low salinity water, wherein the low salinity water has a total dissolved solids (TDS) content of 15,000 ppmv or less, wherein the ratio of the multivalent cation content of the low salinity water to a multivalent cation content of a connate water of the reservoir is less than 1, and wherein the viscosity of the injection fluid is in the range of 3 to 200 cP, wherein preparing the injection fluid comprises matching the viscosity of the injection fluid within the reservoir to the viscosity of the oil under reservoir conditions such that a ratio of a mobility of the injection fluid to a mobility of the oil in the reservoir is less than one, wherein the reservoir is penetrated by one or more injection wells and by one or more production wells, and wherein the reservoir contains oil having a viscosity of from 3 to 200 cP;

initiating injection of the injection fluid into at least one of the injection wells in a slug size in the range of 0.3 to 2.0 pore volumes (PV); and sweeping oil in the reservoir towards at least one of the one or more production wells.

* * * * *